(12) United States Patent
Kim et al.

(10) Patent No.: US 11,993,280 B2
(45) Date of Patent: May 28, 2024

(54) AUTONOMOUS VEHICLE AND METHOD FOR CONTROLLING THE SAME

(71) Applicant: LG ELECTRONICS INC., Seoul (KR)

(72) Inventors: Jeongin Kim, Seoul (KR); Dongsun Lee, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 654 days.

(21) Appl. No.: 17/155,667

(22) Filed: Jan. 22, 2021

(65) Prior Publication Data

US 2021/0229698 A1 Jul. 29, 2021

(30) Foreign Application Priority Data

Jan. 28, 2020 (KR) ........................ 10-2020-0009867

(51) Int. Cl.
*H04W 4/40* (2018.01)
*B60W 60/00* (2020.01)
*H04B 7/0413* (2017.01)
*H04B 7/26* (2006.01)
*H04W 56/00* (2009.01)
*H04W 76/10* (2018.01)

(52) U.S. Cl.
CPC ......... *B60W 60/001* (2020.02); *H04B 7/0413* (2013.01); *H04B 7/2606* (2013.01); *H04B 7/2678* (2013.01); *H04W 4/40* (2018.02); *H04W 56/00* (2013.01); *H04W 56/0015* (2013.01); *H04W 56/0025* (2013.01)

(58) Field of Classification Search
CPC . B60W 60/001; H04B 7/0413; H04B 7/2606; H04B 7/2678; H04B 7/0695; H04B 7/088; H04B 7/2662; H04B 1/3822; H04W 4/40; H04W 56/00; H04W 56/0015; H04W 56/0025; H04W 56/001; H04L 7/0079
USPC ....................................................... 455/422.1
See application file for complete search history.

(56) References Cited

U.S. PATENT DOCUMENTS 11,375,527 B1 * 6/2022 Eyuboglu .......... H04B 7/15528
2019/0037421 A1 * 1/2019 Eyuboglu ............... H04L 69/28
2019/0178983 A1 * 6/2019 Lin ....................... G01S 7/4021

* cited by examiner

*Primary Examiner* — Tanmay K Shah
(74) *Attorney, Agent, or Firm* — LEE, HONG, DEGERMAN, KANG & WAIMEY

(57) ABSTRACT

An autonomous vehicle and a method for controlling the same are disclosed. A method for controlling an autonomous vehicle including a baseband modem and a plurality of distributed antennas includes applying an initial clock of the baseband modem to clocks of the plurality of distributed antennas, receiving base station data from an external base station via the plurality of distributed antennas to which the initial clock is applied, and synchronizing a clock of the baseband modem with a clock of the base station based on the base station data, and thus can achieve low cost design using a data clock recovery. The autonomous vehicle, a user terminal, and a server can be associated with an artificial intelligence module, a unmanned aerial vehicle (UAV), a robot, an augmented reality (AR) device, a virtual reality (VR) device, devices related to 3G, 4G, 5G and/6G services.

6 Claims, 16 Drawing Sheets

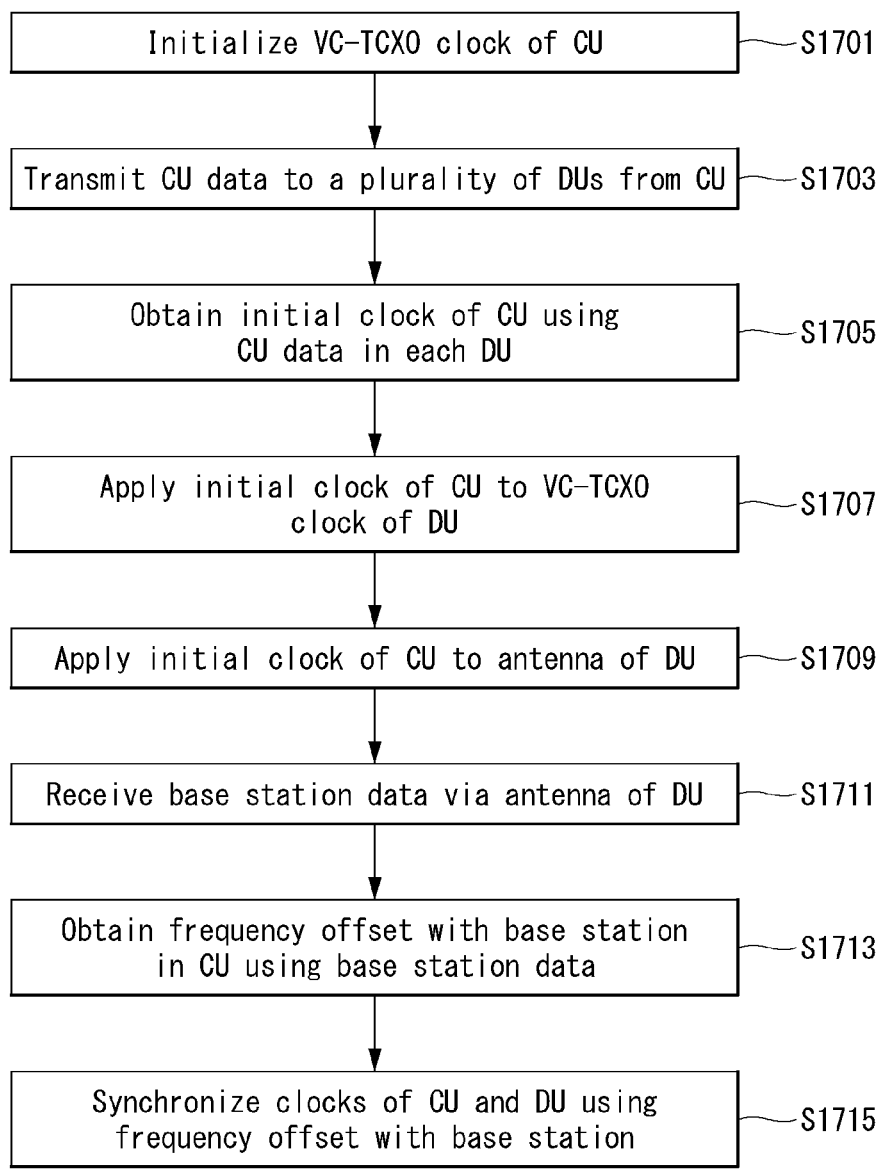

AUTONOMOUS VEHICLE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2020-0009867, filed on Jan. 28, 2020, the contents of which are hereby incorporated by reference herein in its entirety.

TECHNICAL FIELD

The present disclosure relates to a method and device for wireless communication of a vehicle in an autonomous system, and more particularly to an autonomous vehicle for performing wireless communication via multiple antennas and a method for controlling the same.

BACKGROUND

Vehicles can be classified into an internal combustion engine vehicle, an external composition engine vehicle, a gas turbine vehicle, an electric vehicle, etc. according to types of motors used therefor.

An autonomous vehicle refers to a self-driving vehicle that can travel without an operation of a driver or a passenger, and an autonomous system refers to a system that monitors and controls the autonomous vehicle such that the autonomous vehicle can perform self-driving.

A main controller of an autonomous vehicle with distributed antenna structure must share operating clocks with a plurality of distributed antenna modules so as to perform normal data transmission and reception with the plurality of distributed antenna modules. A user equipment (UE) must be synchronized with operating clocks of a base station.

However, since each antenna module and the main controller are separated into a distributed unit and a central unit in the distributed antenna structure, there is need for a method for synchronizing clocks of respective units in such a connection structure.

SUMMARY

An object of the present disclosure is to address the above-described and other needs and/or problems.

Another object of the present disclosure is to implement an autonomous vehicle and a method of controlling the autonomous vehicle for synchronizing clocks between a main controller and each antenna unit and for synchronizing cocks of a base station and the autonomous vehicle in a distributed antenna structure of the autonomous vehicle.

In one aspect of the present disclosure, there is provided a method for controlling an autonomous vehicle including a baseband modem and a plurality of distributed antennas, the method comprising applying an initial clock of the baseband modem to clocks of the plurality of distributed antennas; receiving base station data from an external base station via the plurality of distributed antennas to which the initial clock is applied; and synchronizing a clock of the baseband modem with a clock of the base station based on the base station data.

Synchronizing the clock of the baseband modem with the clock of the base station may comprise transmitting the base station data to the baseband modem from the plurality of distributed antennas via a high speed serial interface connecting the baseband modem to the plurality of distributed antennas.

The method may further comprise applying the clock of the base station to the clocks of the plurality of distributed antennas.

Applying the clock of the base station to the clocks of the plurality of distributed antennas may comprise transmitting the clock of the base station to the plurality of distributed antennas via the high speed serial interface.

The high speed serial interface may include path interfaces of which a number is equal to or less than a number of the plurality of distributed antennas.

In another aspect of the present disclosure, there is provided an autonomous vehicle comprising a processor configured to control a function of the autonomous vehicle; a memory coupled to the processor and configured to store data for control of the autonomous vehicle; and a communication unit coupled to the processor and configured to transmit and receive the data for control of the autonomous vehicle, wherein the memory is configured to store instructions that allow the processor to apply an initial clock of a baseband modem included in the communication unit to clocks of a plurality of distributed antennas included in the communication unit; receive base station data from an external base station through the communication unit via the plurality of distributed antennas to which the initial clock is applied; and synchronize a clock of the baseband modem with a clock of the base station based on the base station data.

The processor may be configured to transmit the base station data to the baseband modem from the plurality of distributed antennas via a high speed serial interface connecting the baseband modem to the plurality of distributed antennas.

The processor may be configured to apply the clock of the base station to the clocks of the plurality of distributed antennas.

The processor may be configured to transmit the clock of the base station to the plurality of distributed antennas via the high speed serial interface.

The high speed serial interface may include path interfaces of which a number is equal to or less than a number of the plurality of distributed antennas.

Effects of an autonomous vehicle and a method of controlling the autonomous vehicle according to an embodiment of the present disclosure are described as follows.

The present disclosure can achieve low cost design using data clock recovery by presenting a method for synchronizing clocks of a central unit (controller) and distributed units (antennas) in the autonomous vehicle with a distributed antenna structure.

The present disclosure can provide faster data transmission/reception performance using a high speed serial interface (HSSI) between a central unit and distributed units, compared to the existing analog interface.

The present disclosure can improve wireless communication performance of an autonomous system by improving scalability of the distributed antenna structure.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 17 is a flow chart illustrating a detailed example of a clock synchronization method of an autonomous vehicle according to an embodiment of the present disclosure.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

A. Example of Block Diagram of UE and 5G Network

Figure 1:
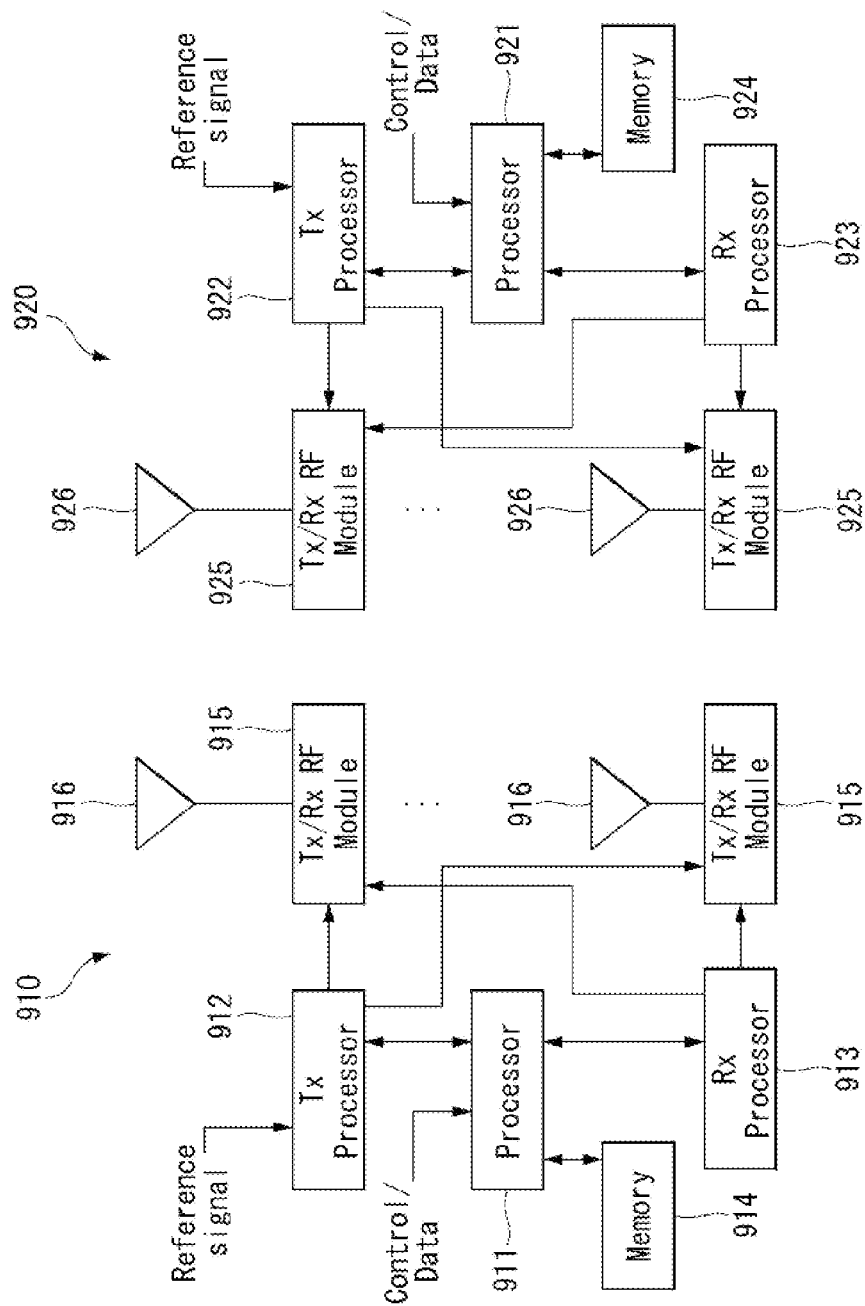
FIG. 1 illustrates a block diagram of configuration of a wireless communication system to which methods described in the present disclosure are applicable.

FIG. 1 illustrates a block diagram of configuration of a wireless communication system to which methods described in the present disclosure are applicable.

Referring to FIG. 1, a device (autonomous device) including an autonomous module is defined as a first communication device 910, and a processor 911 can perform detailed autonomous operations.

A 5G network including another vehicle communicating with the autonomous device is defined as a second communication device 920, and a processor 921 can perform detailed autonomous operations.

The 5G network may be represented as the first communication device, and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 respectively include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal via each antenna 926. The processor implements the functions, processes and/or methods described above. The processor 921 may be related to the memory 924 that stores program codes and data. The memory may be referred to as a computer-readable medium. More specifically, in downlink (DL) (communication from the first communication device to the second communication device), the Tx processor 912 implements various signal processing functions in L1 layer (i.e., physical layer). The Rx processor implements various signal processing functions of L1 layer (i.e., physical layer).

Uplink (UL) (communication from the second communication device to the first communication device) is processed in the first communication device 910 in a way similar to that described in association with a receiver function in the second communication device 920. Each Tx/Rx module 925 receives a signal via each antenna 926. Each Tx/Rx module provides RF carriers and information to the Rx processor 923. The processor 921 may be related to the memory 924 that stores program codes and data. The memory may be referred to as a computer-readable medium.

B. Signal Transmission/Reception Method in Wireless Communication System

Figure 2:
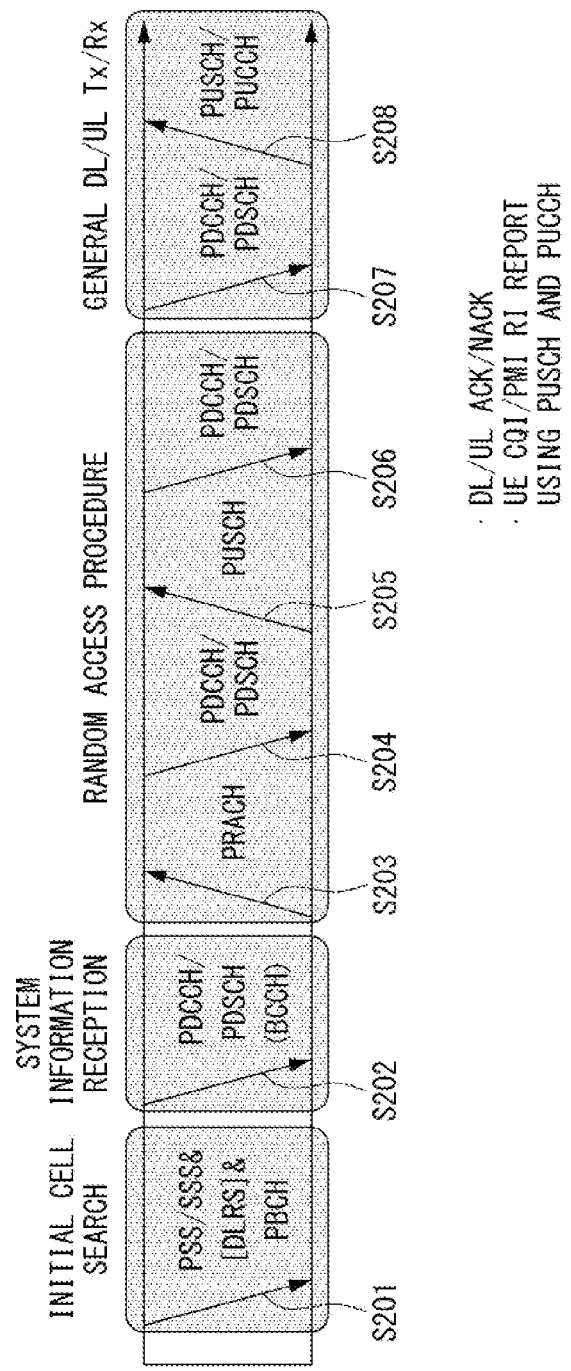
FIG. 2 illustrates an example of a signal transmission/reception method in a wireless communication system.

FIG. 2 illustrates physical channels and general signal transmission used in a 3GPP system.

In a wireless communication system, a UE receives information from a base station (BS) via downlink and transmits information to the base station via uplink. Information that the UE and the base station transmit and receive includes data and various control information, and various physical channels exist depending on type/use of information that the UE and the base station transmit and receive.

When the UE is powered on or enters a new cell, the UE performs an initial cell search operation, for example, synchronization with the base station in S201. For this operation, the UE may receive a primary synchronization signal (PSS) and a secondary synchronization signal (SSS) from the base station to synchronize with the base station and acquire information such as a cell ID. Afterwards, the UE may receive a physical broadcast channel (PBCH) from the base station to acquire broadcast information in the cell. The UE may receive a downlink reference signal (DL RS) in the initial cell search step to check a downlink channel state.

After the initial cell search, the UE may acquire more detailed system information by receiving a physical downlink shared channel (PDSCH) according to a physical downlink control channel (PDCCH) and information contained in the PDCCH, in S202.

When the UE initially accesses the BS or has no radio resource for signal transmission, the UE may perform a random access procedure (RACH) for the base station in S203 to S206. To this end, the UE may transmit a specific sequence as a preamble via a physical random access channel (PRACH) in S203 and S205, and receive a random access response (RAR) message for the preamble via the PDCCH and a corresponding PDSCH. In the case of a contention-based RACH, a contention resolution procedure may be additionally performed in S206.

After the UE performs the above-described procedures, the UE may perform PDCCH/PDSCH reception (S207) and physical uplink shared channel (PUSCH)/physical uplink control channel (PUCCH) transmission (S208), as a normal uplink/downlink signal transmission procedure. Particularly, the UE may receive downlink control information (DCI) via the PDCCH. The DCI includes control information such as resource allocation information for the UE, and different formats may be applied to the DCI depending on the use purpose.

Control information that the UE transmits to the base station via uplink or receives from the base station via uplink may include downlink/uplink ACK/NACK signal, a channel quality indicator (CQI), a precoding matrix index (PMI), a rank indicator (RI), and the like. The UE may transmit the control information such as CQI/PMI/RI via PUSCH and/or PUCCH.

An initial access (IA) procedure in a 5G communication system is additionally described with reference to FIG. 2.

The UE can perform cell search, system information acquisition, beam alignment for initial access, and DL measurement based on an SSB. The SSB is interchangeably used with a synchronization signal/physical broadcast channel (SS/PBCH) block.

The SSB includes a PSS, an SSS and a PBCH. The SSB consists of four consecutive OFDM symbols, and the PSS, the PBCH, the SSS/PBCH or the PBCH is transmitted per OFDM symbol. Each of the PSS and the SSS consists of one OFDM symbol and 127 subcarriers, and the PBCH consists of 3 OFDM symbols and 576 subcarriers.

The cell search refers to a process in which a UE acquires time/frequency synchronization of a cell and detects a cell identifier (ID) (e.g., physical layer cell ID (PCI)) of the cell. The PSS is used to detect a cell ID from a cell ID group, and the SSS is used to detect a cell ID group. The PBCH is used to detect an SSB (time) index and a half-frame.

There are 336 cell ID groups, and there are 3 cell IDs per cell ID group. A total of 1008 cell IDs are present. Information on a cell ID group to which a cell ID of a cell belongs is provided/acquired via an SSS of the cell, and information on the cell ID among 336 cell ID groups is provided/acquired via a PSS.

The SSB is periodically transmitted in accordance with SSB periodicity. A default SSB periodicity assumed by the UE during initial cell search is defined as 20 ms. After cell access, the SSB periodicity may be set to one of {5 ms, 10 ms, 20 ms, 40 ms, 80 ms, 160 ms} by a network (e.g., a BS).

Next, acquisition of system information (SI) is described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS via a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in the 5G communication system is additionally described with reference to FIG. 2.

A random access procedure is used for various purposes. For example, the random access procedure can be used for network initial access, handover, and UE-triggered UL data transmission. The UE can acquire UL synchronization and UL transmission resources through the random access procedure. The random access procedure is classified into a contention-based random access procedure and a contention-free random access procedure. A detailed procedure for the contention-based random access procedure is as follows.

The UE can transmit a random access preamble via PRACH as Msg1 of a random access procedure in UL. Random access preamble sequences with two different lengths are supported. Long sequence length 839 is applied to subcarrier spacings of 1.25 kHz and 5 kHz, and short sequence length 139 is applied to subcarrier spacings of 15 kHz, 30 kHz, 60 kHz and 120 kHz.

When a BS receives the random access preamble from the UE, the BS sends a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, i.e., Msg1. Presence or absence of random access information with respect to Msg1 transmitted by the UE can be determined depending on presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission based on most recent path loss and a power ramping counter.

The UE can perform UL transmission as Msg3 of the random access procedure on a physical uplink shared channel based on the random access response information. The Msg3 may include an RRC connection request and a UE ID. The network may transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure may be divided into (1) a DL BM procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

The DL BM procedure using an SSB is described.

Configuration for a beam report using an SSB is performed upon configuration of channel state information (CSI)/beam in RRC CONNECTED.

A UE receives, from a BS, a CSI-ResourceConfig IE including CSI-SSB-ResourceSetList for SSB resources used for BM. The RRC parameter "csi-SSB-Resource-SetList" represents a list of SSB resources used for beam management and report in one resource set. An SSB resource set may be configured as {SSBx1, SSBx2, SSBx3, SSBx4, . . . }. An SSB index may be defined in the range of 0 to 63.

The UE receives, from the BS, signals on SSB resources based on CSI-SSB-ResourceSetList.

When CSI-RS reportConfig related to a report for SSBRI and reference signal received power (RSRP) is configured, the UE reports the best SSBRI and RSRP corresponding to this to the BS. For example, when reportQuantity of the CSI-RS reportConfig IE is configured to 'ssb-Index-RSRP', the UE reports the best SSBRI and RSRP corresponding to this to the BS.

When CSI-RS resource is configured to the same OFDM symbol(s) as SSB and 'QCL-TypeD' is applicable, the UE may assume that the CSI-RS and the SSB are quasi co-located (QCL) from the viewpoint of 'QCL-TypeD'. Here, 'QCL-TypeD' may mean that antenna ports are quasi co-located from the viewpoint of a spatial Rx parameter. When the UE receives signals of a plurality of DL antenna ports with a QCL-TypeD relationship, the same Rx beam can be applied.

Next, a DL BM procedure using a CSI-RS is described.

An Rx beam determination (or refinement) procedure of the UE and a Tx beam swiping procedure of the BS using a CSI-RS are sequentially described. A repetition parameter is set to 'ON' in the Rx beam determination procedure of the UE, and is set to 'OFF' in the Tx beam swiping procedure of the BS.

First, the Rx beam determination procedure of the UE is described.

The UE receives, from the BS, an NZP CSI-RS resource set IE including an RRC parameter for 'repetition' via RRC signaling. The RRC parameter 'repetition' is set to 'ON'.

The UE repeatedly receives signals on resource(s) in a CSI-RS resource set, in which the RRC parameter 'repetition' is set to 'ON', in different OFDM symbols through the same Tx beam (or DL spatial domain transmission filter) of the BS.

The UE determines its RX beam.

The UE skips a CSI report. That is, the UE may skip a CSI report when the RRC parameter 'repetition' is set to 'ON'.

Next, the Tx beam determination procedure of the BS is described.

The UE receives, from the BS, an NZP CSI-RS resource set IE including an RRC parameter for 'repetition' via RRC signaling. The RRC parameter 'repetition' is set to 'OFF' and is related to the Tx beam swiping procedure of the BS.

The UE receives signals on resources in a CSI-RS resource set, in which the RRC parameter 'repetition' is set to 'OFF', in different Tx beams (DL spatial domain transmission filter) of the BS.

The UE selects (or determines) a best beam.

The UE reports an ID (e.g., CRI) of the selected beam and related quality information (e.g., RSRP) to the BS. That is, when a CSI-RS is transmitted for the BM, the UE reports a CRI and RSRP with respect thereto to the BS.

Next, the UL BM procedure using an SRS is described.

The UE receives, from the BS, RRC signaling (e.g., SRS-Config IE) including a (RRC parameter) purpose parameter configured to 'beam management". The SRS-Config IE is used to configure SRS transmission. The SRS-Config IE includes a list of SRS-Resources and a list of SRS-ResourceSets. Each SRS resource set refers to a set of SRS-resources.

The UE determines Tx beamforming for SRS resources to be transmitted based on SRS-SpatialRelation Info included in the SRS-Config IE. SRS-SpatialRelation Info is configured per SRS resource and represents whether the same beamforming as beamforming used for an SSB, a CSI-RS or an SRS is applied per each SRS resource.

When SRS-SpatialRelationInfo is configured for SRS resources, the same beamforming as beamforming used for the SSB, CSI-RS or SRS is applied and transmitted. However, when SRS-SpatialRelationInfo is not configured for SRS resources, the UE randomly determines Tx beamforming and transmits an SRS through the determined Tx beamforming.

Next, a beam failure recovery (BFR) procedure is described.

In a beamformed system, radio link failure (RLF) may frequently occur due to rotation, movement or beamforming blockage of the UE. Thus, BFR is supported in NR to prevent frequent occurrence of RLF. The BFR is similar to a radio link failure recovery procedure and may be supported when the UE knows new candidate beam(s). For beam failure detection, the BS configures beam failure detection reference signals to the UE, and the UE declares beam failure when the number of beam failure indications from the physical layer of the UE reaches a threshold configured via RRC signaling within a period configured via RRC signaling of the BS. After the beam failure detection, the UE triggers beam failure recovery by initiating a random access procedure on PCell and performs the beam failure recovery by selecting a suitable beam (when the BS provides dedicated random access resources for certain beams, these are prioritized by the UE). The completion of the random access procedure is regarded as completion of beam failure recovery.

D. Ultra-Reliable and Low Latency Communication (URLLC)

URLLC transmission defined in NR may refer to (1) a relatively low traffic size, (2) a relatively low arrival rate, (3) extremely low latency requirements (e.g., 0.5 ms and 1 ms), (4) relatively short transmission duration (e.g., 2 OFDM symbols), (5) urgent services/messages, etc. In UL, transmission of traffic of a specific type (e.g., URLLC) needs to be multiplexed with another transmission (e.g., eMBB) scheduled in advance in order to satisfy more stringent latency requirements. In this regard, a method is provided, which provides information indicating preemption of specific resources to the pre-scheduled UE and allows a URLLC UE to use the corresponding resources for UL transmission.

NR supports dynamic resource sharing between eMBB and URLLC. eMBB and URLLC services may be scheduled on non-overlapping time/frequency resources, and URLLC transmission may occur in resources scheduled for ongoing eMBB traffic. An eMBB UE may not ascertain whether PDSCH transmission of the corresponding UE has been partially punctured, and the UE may not decode a PDSCH due to corrupted coded bits. In view of this, NR provides a preemption indication. The preemption indication may also be referred to as an interrupted transmission indication.

With regard to the preemption indication, the UE receives DownlinkPreemption IE via RRC signaling from the BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of locations for fields in DCI format 2_1 according to a set of serving cells and positionInDCI by INT-ConfigurationPerServing Cell including a set of serving cell indexes provided by servingCellID, is configured with an information payload size for DCI format 2_1 by dci-Payloadsize, and is configured with indication granularity of time-frequency resources by timeFrequency Sect.

The UE receives, from the BS, DCI format 2_1 based on the DownlinkPreemption IE.

When the UE detects DCI format 2_1 for a serving cell in a configured set of serving cells, the UE may assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in time-frequency resources indicated by preemption is not DL transmission scheduled to the UE, and decodes data based on signals received in the remaining resource region.

E. Massive MTC (mMTC)

Massive machine type communication (mMTC) is one of 5G scenarios for supporting a hyper-connection service that simultaneously communicate with a large number of UEs. In this environment, a UE intermittently performs communication with a very low speed and mobility. Thus, a main goal of mMTC is operating the UE for a long time at a low cost. In regard to mMTC technology, 3GPP deals with MTC and narrowband (NB)-IoT.

The mMTC technology has features such as repetitive transmission, frequency hopping, retuning, and a guard period of a PDCCH, a PUCCH, a physical downlink shared channel (PDSCH), a PUSCH, etc.

That is, PUSCH (or PUCCH (particularly, long PUCCH) or a PRACH) including specific information and PDSCH (or PDCCH) including a response to the specific information are repeatedly transmitted. The repetitive transmission is performed through frequency hopping. For the repetitive transmission, (RF) retuning from a first frequency resource to a second frequency resource is performed in the guard period, and the specific information and the response to the specific information may be transmitted/received through a narrowband (e.g., 6 resource blocks (RBs) or 1 RB).

F. Basic Operation Between Autonomous Vehicles Using 5G Communication

Figure 3:
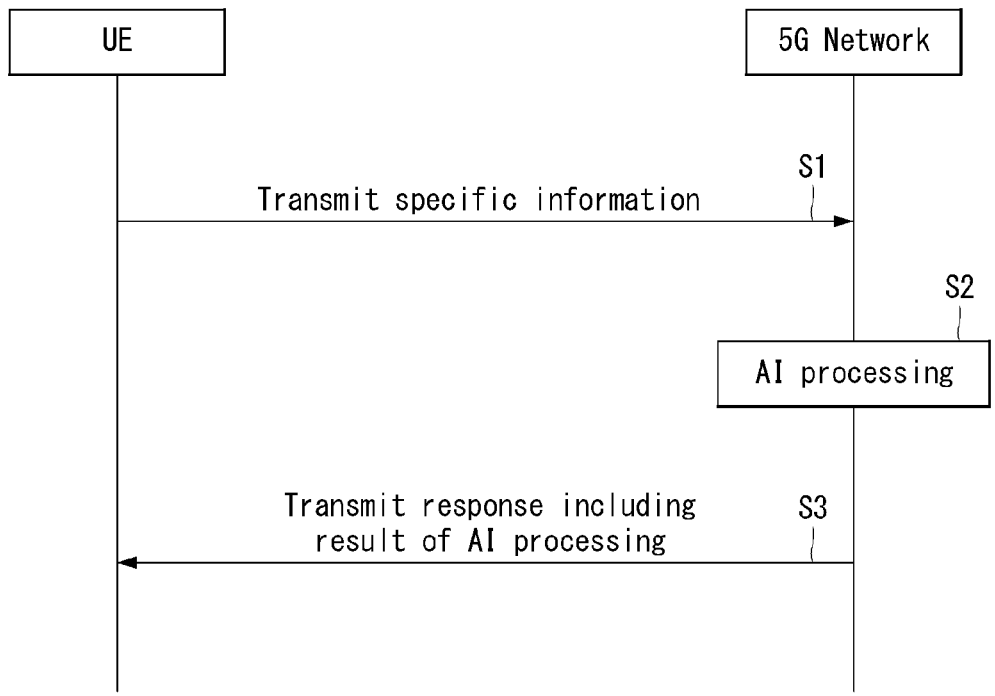
FIG. 3 illustrates an example of a basic operation of an autonomous vehicle and a 5G network in a 5G communication system.

FIG. 3 illustrates an example of a basic operation of an autonomous vehicle and a 5G network in a 5G communication system.

An autonomous vehicle transmits specific information to the 5G network in S1. The specific information may include autonomous driving related information. The 5G network may determine whether to remotely control the vehicle in S2. The 5G network may include a server or a module which performs remote control related to autonomous driving. In addition, the 5G network may transmit information (or signal) related to remote control to the autonomous vehicle in S3.

G. Applied operation between Autonomous Vehicle and 5G Network in 5G Communication System An operation of an autonomous vehicle using 5G communication is described in more detail below with reference to the wireless communication technology (BM procedure, URLLC, mMTC, etc.) described in FIGS. 1 and 2.

First, a basic procedure of an applied operation, to which a method according to the present disclosure to be described later and eMBB of 5G communication are applied, is described.

As in steps S1 and S3 of FIG. 3, the autonomous vehicle performs an initial access procedure and a random access procedure with the 5G network prior to step S1 of FIG. 3, in order to transmit/receive signals, information and the like to/from the 5G network.

More specifically, the autonomous vehicle performs an initial access procedure with the 5G network based on SSB, in order to acquire DL synchronization and system information. A beam management (BM) procedure and a beam failure recovery procedure may be added in the initial access procedure, and a quasi-co-location (QCL) relationship may be added in a process in which the autonomous vehicle receives a signal from the 5G network.

In addition, the autonomous vehicle performs a random access procedure with the 5G network for UL synchronization acquisition and/or UL transmission. The 5G network may transmit, to the autonomous vehicle, a UL grant for scheduling transmission of specific information. Thus, the autonomous vehicle transmits the specific information to the 5G network based on the UL grant. In addition, the 5G network transmits, to the autonomous vehicle, a DL grant for scheduling transmission of a result of 5G processing for the specific information. Thus, the 5G network may transmit, to the autonomous vehicle, information (or a signal) related to remote control based on the DL grant.

Next, a basic procedure of an applied operation, to which a method according to the present disclosure to be described later and URLLC of 5G communication are applied, is described.

As described above, the autonomous vehicle may receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network based on DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle may receive a UL grant from the 5G network.

Next, a basic procedure of an applied operation, to which a method according to the present disclosure to be described later and mMTC of 5G communication are applied, is described.

Description will focus on parts in the steps of FIG. 3 which are changed according to application of mMTC.

In step S1 of FIG. 3, the autonomous vehicle receives a UL grant from the 5G network in order to transmit specific information to the 5G network. The UL grant may include information on the number of repetitions of transmission of the specific information, and the specific information may be repeatedly transmitted based on the information on the number of repetitions. That is, the autonomous vehicle transmits the specific information to the 5G network based on the UL grant. The repetitive transmission of the specific information may be performed through frequency hopping, the first transmission of the specific information may be performed in a first frequency resource, and the second transmission of the specific information may be performed in a second frequency resource. The specific information may be transmitted on a narrowband of 6 resource blocks (RBs) or 1 RB.

H. Autonomous Driving Operation Between Vehicles Using 5G Communication

Figure 4:
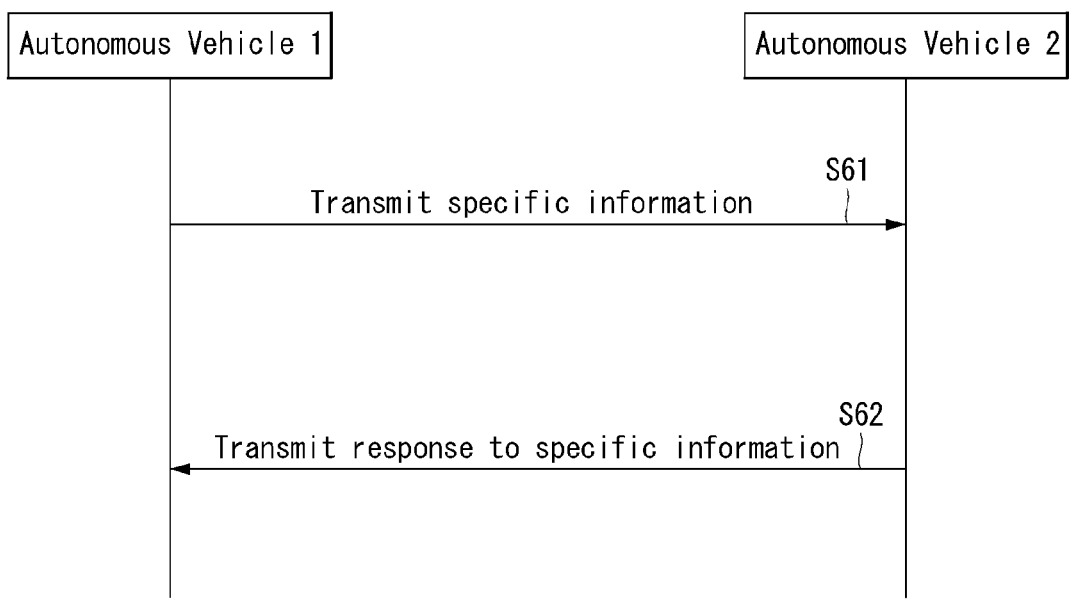
FIG. 4 illustrates an example of a basic operation between vehicles using 5G communication.

FIG. 4 illustrates an example of a basic operation between vehicles using 5G communication.

A first vehicle transmits specific information to a second vehicle in S61. The second vehicle transmits a response to the specific information to the first vehicle in S62.

Configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication is described.

First, a method in which a 5G network is directly involved in resource allocation for signal transmission/reception between vehicles is described.

The 5G network may transmit DCI format 5A to the first vehicle for scheduling of mode-3 transmission (PSCCH and/or PSSCH transmission). The physical sidelink control channel (PSCCH) is a 5G physical channel for scheduling of transmission of specific information, and the physical sidelink shared channel (PSSCH) is a 5G physical channel for transmission of specific information. In addition, the first vehicle transmits, to the second vehicle, SCI format 1 for scheduling of specific information transmission on PSCCH. Then, the first vehicle transmits the specific information to the second vehicle on PSSCH.

Next, a method in which a 5G network is indirectly involved in resource allocation for signal transmission/reception is described.

The first vehicle senses resources for mode-4 transmission in a first window. Then, the first vehicle selects resources for mode-4 transmission in a second window based on a result of sensing. The first window refers to a sensing window, and the second window refers to a selection window. The first vehicle transmits, to the second vehicle, SCI format 1 for scheduling of transmission of specific information on PSCCH based on the selected resources. Then, the first vehicle transmits the specific information to the second vehicle on PSSCH.

The above-described 5G communication technology can be combined with methods according to the present disclosure to be described later and applied, or can complement methods described in the present disclosure to make technical features of the methods concrete and clear.

Driving (1) Exterior of Vehicle

Figure 5:
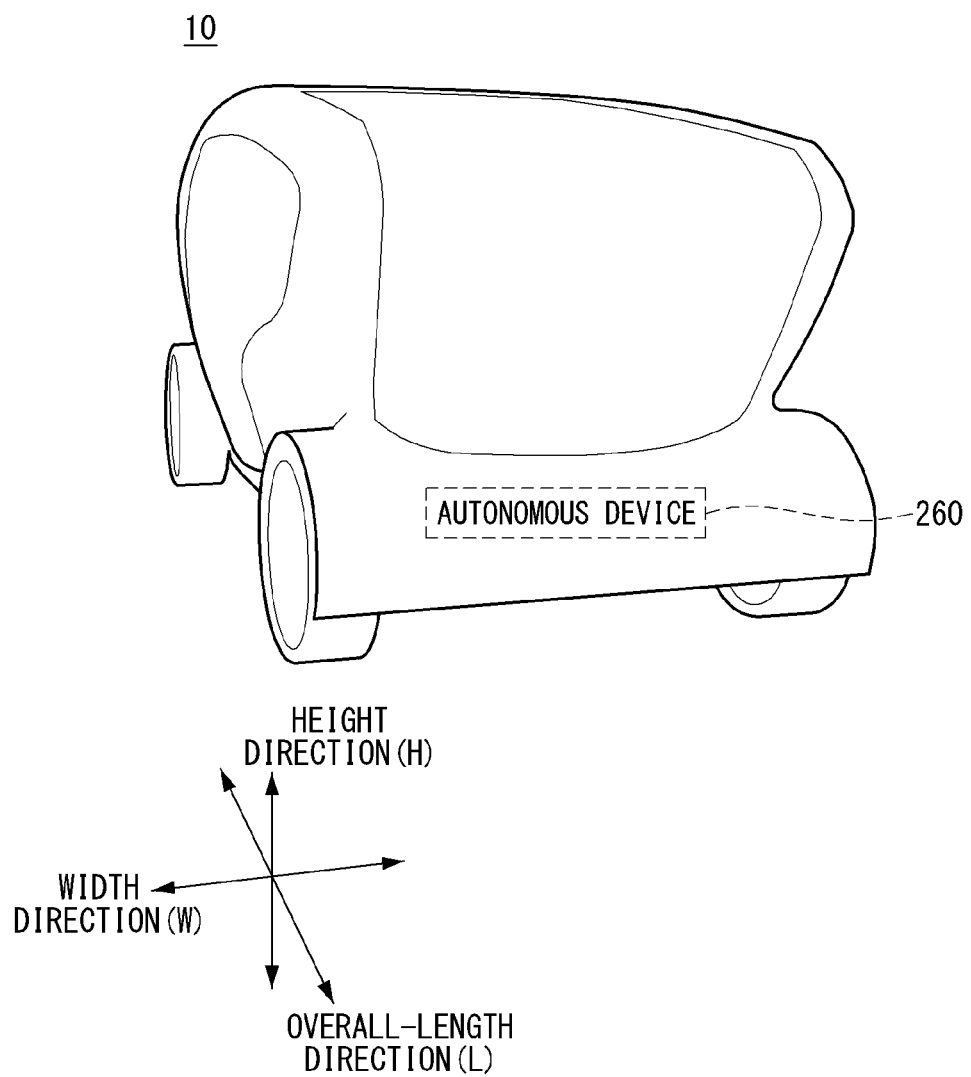
FIG. 5 illustrates a vehicle according to an embodiment of the present disclosure.

FIG. 5 illustrates a vehicle according to an embodiment of the present disclosure.

Referring to FIG. 5, a vehicle 10 according to an embodiment of the present disclosure is defined as a transportation means traveling on roads or railroads. The vehicle 10 includes a car, a train, and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
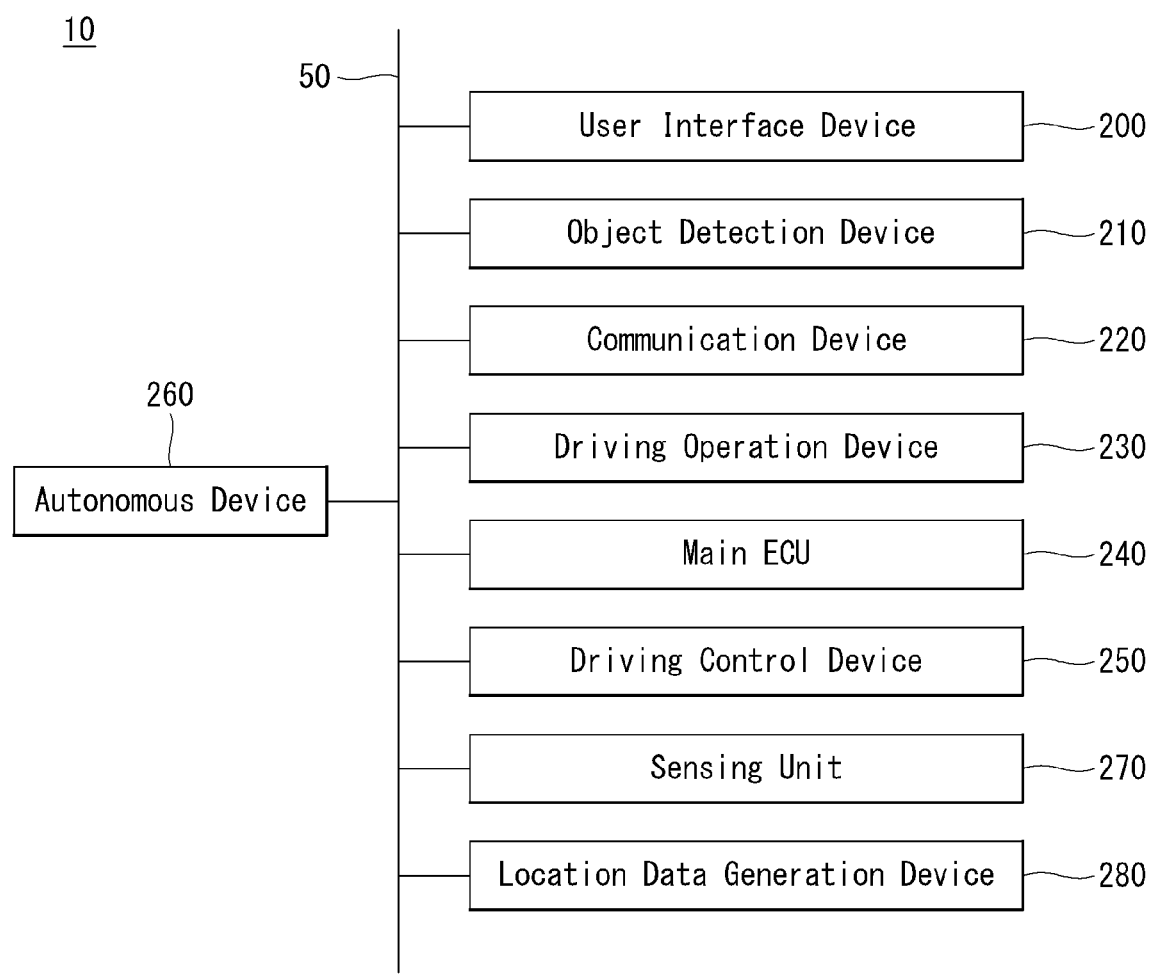
FIG. 6 is a control block diagram of a vehicle according to an embodiment of the present disclosure.

FIG. 6 is a control block diagram of a vehicle according to an embodiment of the present disclosure.

Referring to FIG. 6, a vehicle 10 may include a user interface device 200, an object detection device 210, a communication device 220, a driving operation device 230, a main ECU 240, a driving control device 250, an autonomous device 260, a sensing unit 270, and a location data generation device 280. Each of the object detection device 210, the communication device 220, the driving operation device 230, the main ECU 240, the driving control device 250, the autonomous device 260, the sensing unit 270, and the location data generation device 280 may be implemented as an electronic device which generates electric signals and exchange the electric signals from one another.

1) User Interface Device

The user interface device 200 is a device for communication between the vehicle 10 and a user. The user interface device 200 may receive a user input and provide information generated in the vehicle 10 to the user. The vehicle 10 may implement a user interface (UI) or user experience (UX) through the user interface device 200. The user interface device 200 may include an input device, an output device, and a user monitoring device.

2) Object Detection Device

The object detection device 210 may generate information about objects outside the vehicle 10. The information about objects may include at least one of information on presence or absence of the object, location information of the object, information on a distance between the vehicle 10 and the object, and information on a relative speed of the vehicle 10 with respect to the object. The object detection device 210 may detect objects outside the vehicle 10. The object detection device 210 may include at least one sensor which may detect objects outside the vehicle 10. The object detection device 210 may include at least one of a camera, a radar, a lidar, an ultrasonic sensor, and an infrared sensor. The object detection device 210 may provide data for an object generated based on a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects based on the processed signals.

The camera may be at least one of a mono camera, a stereo camera and an around view monitoring (AVM) camera. The camera can acquire location information of objects, information on distances to objects, or information on relative speeds with respect to objects using various image processing algorithms. For example, the camera can acquire information on a distance to an object and information on a relative speed with respect to the object from an acquired image based on change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera based on disparity information.

The camera may be attached at a portion of the vehicle at which FOV (field of view) can be secured in order to photograph the outside of the vehicle. The camera may be disposed in proximity to the front windshield inside the vehicle in order to acquire front images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information on an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object based on the processed signals. The radar may be implemented as a pulse radar or a continuous wave radar in terms of electromagnetic wave emission. The continuous wave radar may be implemented as a frequency modulated continuous wave (FMCW) radar or a frequency shift keying (FSK) radar according to signal waveform. The radar can detect an object by means of electromagnetic waves based on a time of flight (TOF) method or a phase shift method, and detect a location of the detected object, a distance to the detected object, and a relative speed with respect to the detected object. The radar may be disposed at an appropriate location outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object based on the processed signal. The lidar may be implemented by the TOF method or the phase shift method. The lidar may be implemented in a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object be means of laser beams based on the TOF method or the phase shift method and detect the location of the detected object, a distance to the detected object, and a relative speed with respect to the detected object. The lidar may be disposed at an appropriate location outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle, and a terminal. The communication device 220 may include a transmission antenna, a reception antenna, and at least one of a radio frequency (RF) circuit and an RF element, which can implement various communication protocols, in order to perform communication.

For example, the communication device can exchange signals with external devices based on C-V2X (Cellular V2X). For example, C-V2X can include sidelink communication based on LTE and/or sidelink communication based on NR. Details related to C-V2X will be described later.

For example, the communication device can exchange signals with external devices based on dedicated short range communications (DSRC) or wireless access in vehicular environment (WAVE) standards based on IEEE 802.11p PHY/MAC layer technology and IEEE 1609 Network/Transport layer technology. The DSRC (or WAVE standards) is communication specifications for providing an intelligent transport system (ITS) service through short-range dedicated communication between vehicle-mounted devices or between a roadside device and a vehicle-mounted device. The DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven based on a signal provided by the driving operation device 230. The driving operation device 230 may include a steering input device (e.g., a steering wheel), an acceleration input device (e.g., an acceleration pedal), and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device, and a suspension driving control device. The safety device driving control device may include a seat belt driving control device for seat belt control.

The driving control device 250 includes at least one electronic control device (e.g., a control electronic control unit (ECU)).

The driving control device 250 can control vehicle driving devices based on signals received by the autonomous device 260. For example, the driving control device 250 can control a power train, a steering device and a brake device based on signals received by the autonomous device 260.

7) Autonomous Device

The autonomous device 260 can generate a route for self-driving based on acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one advanced driver assistance system (ADAS) function. The ADAS can implement at least one of adaptive cruise control (ACC), autonomous emergency braking (AEB), forward collision warning (FCW), lane keeping assist (LKA), lane change assist (LCA), target following assist (TFA), blind spot detection (BSD), high beam assist (HBA), auto parking system (APS), a PD collision warning system, traffic sign recognition (TSR), traffic sign assist (TSA), night vision (NV), driver status monitoring (DSM), and traffic jam assist (TJA).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode based on a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a location module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor, and a magnetic sensor.

The sensing unit 270 can generate vehicle state data based on a signal generated from at least one sensor. The vehicle state data may be information generated based on data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Location Data Generation Device

The location data generation device 280 can generate location data of the vehicle 10. The location data generation device 280 may include at least one of a global positioning system (GPS) and a differential global positioning system (DGPS). The location data generation device 280 can generate location data of the vehicle 10 based on a signal generated from at least one of the GPS and the DGPS. According to an embodiment, the location data generation device 280 can correct location data based on at least one of the inertial measurement unit (IMU) sensor of the sensing unit 270 and the camera of the object detection device 210. The location data generation device 280 may also be called a global navigation satellite system (GNSS).

The vehicle 10 may include an internal communication system 50. The plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

(3) Components of Autonomous Device

Figure 7:
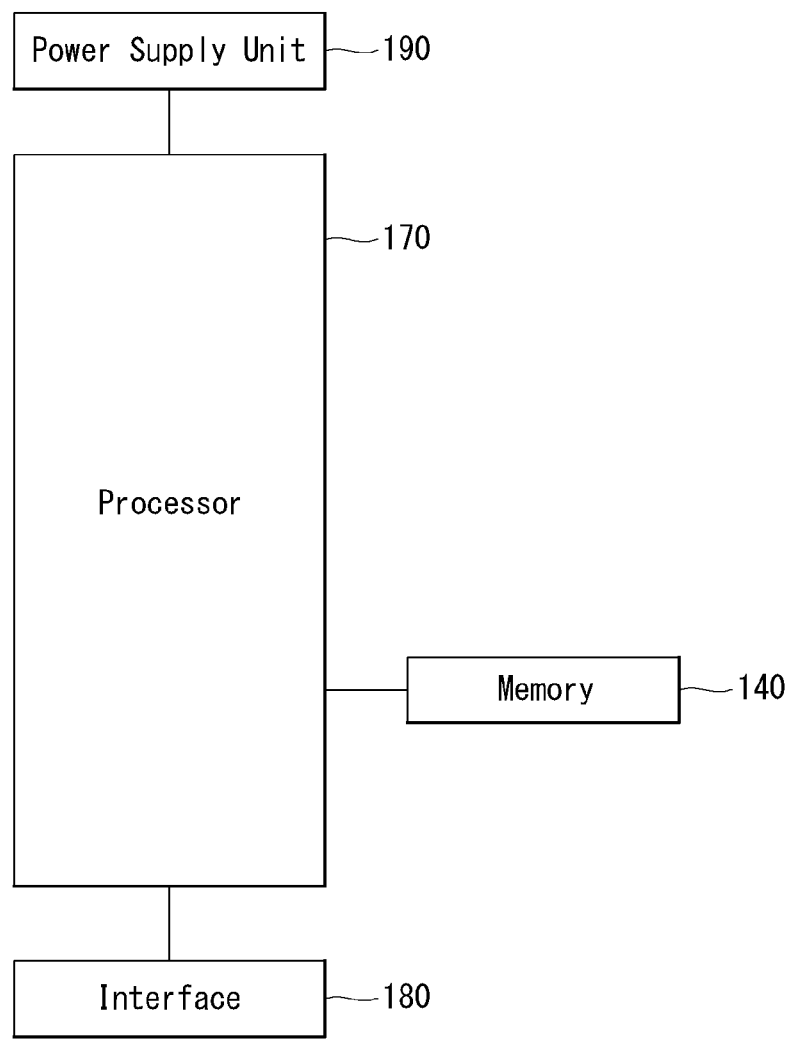
FIG. 7 is a control block diagram of an autonomous device according to an embodiment of the present disclosure.

FIG. 7 is a control block diagram of an autonomous device according to an embodiment of the present disclosure.

Referring to FIG. 7, the autonomous device 260 may include a memory 140, a processor 170, an interface 180, and a power supply unit 190.

The memory 140 is electrically connected to the processor 170. The memory 140 can store basic data for units, control data for operation control of units, and input/output data. The memory 140 can store data processed in the processor 170. Hardware-wise, the memory 140 may be configured as at least one of a ROM, a RAM, an EPROM, a flash drive and a hard drive. The memory 140 may store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 may exchange signals with at least one electronic device included in the vehicle 10 in a wired or wireless manner. The interface 180 may exchange signals with at least one of the object detection device 210, the communication device 220, the driving operation device 230, the main ECU 240, the driving control device 250, the sensing unit 270 and the location data generation device 280 in a wired or wireless manner. The interface 180 may be configured using at least one of a communication module, a terminal, a pin, a cable, a port, a circuit, an element, and a device.

The power supply unit 190 may supply power to the autonomous device 260. The power supply unit 190 may be supplied with power from a power source (e.g., a battery)

included in the vehicle 10 and may supply the power to each unit of the autonomous device 260. The power supply unit 190 may operate in response to a control signal supplied from the main ECU 240. The power supply unit 190 may include a switched-mode power supply (SMPS).

The processor 170 may be electrically connected to the memory 140, the interface 180, and the power supply unit 190 and exchange signals with these components. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 may operate by power supplied from the power supply unit 190. The processor 170 may receive data, process the data, generate a signal and provide the signal in a state in which power is supplied.

The processor 170 may receive information from other electronic devices included in the vehicle 10 via the interface 180. The processor 170 may provide control signals to other electronic devices in the vehicle 10 via the interface 180.

The autonomous device 260 may include at least one printed circuit board (PCB). The memory 140, the interface 180, the power supply unit 190 and the processor 170 may be electrically connected to the PCB.

(4) Operation of Autonomous Device

Figure 8:
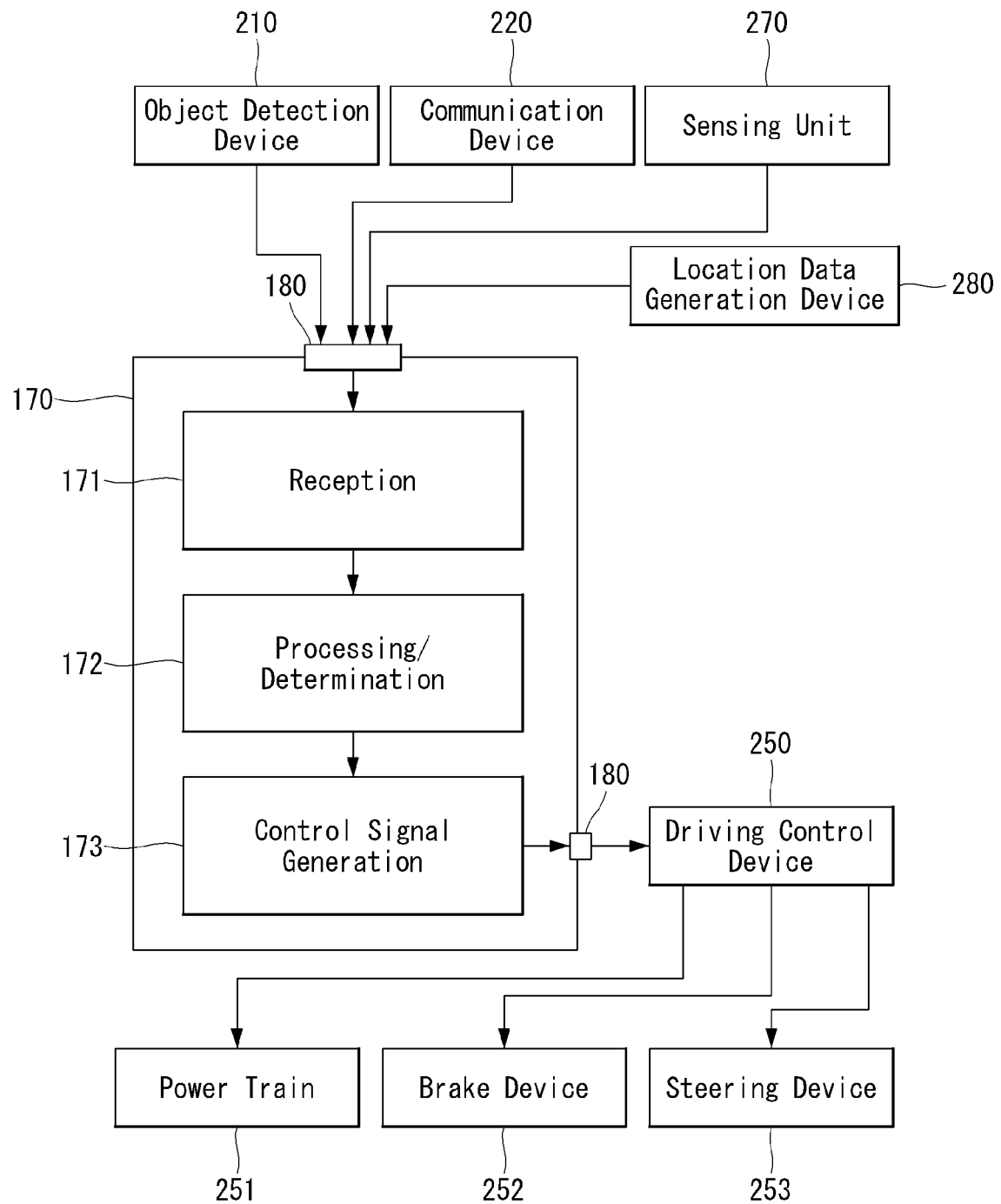
FIG. 8 illustrates a signal flow in an autonomous vehicle according to an embodiment of the present disclosure.

FIG. 8 illustrates a signal flow of an autonomous vehicle according to an embodiment of the present disclosure.

1) Reception Operation

Referring to FIG. 8, the processor 170 may perform a reception operation. The processor 170 may receive data from at least one of the object detection device 210, the communication device 220, the sensing unit 270, and the location data generation device 280 via the interface 180. The processor 170 may receive object data from the object detection device 210. The processor 170 may receive HD map data from the communication device 220. The processor 170 may receive vehicle state data from the sensing unit 270. The processor 170 can receive location data from the location data generation device 280.

2) Processing/Determination Operation

The processor 170 may perform a processing/determination operation. The processor 170 may perform the processing/determination operation based on traveling situation information. The processor 170 may perform the processing/determination operation based on at least one of object data, HD map data, vehicle state data and location data.

2.1) Driving Plan Data Generation Operation

The processor 170 may generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located based on a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data.

According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated based on data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated based on a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data may include a main path and a sub-path. The main path may be understood as a trajectory obtained by connecting roads having a high relative probability of being selected. The sub-path may be branched from at least one decision point on the main path. The sub-path may be understood as a trajectory obtained by connecting at least one road having a low relative probability of being selected at least one decision point on the main path.

3) Control Signal Generation Operation

The processor 170 can perform a control signal generation operation. The processor 170 can generate a control signal based on the electronic horizon data. For example, the processor 170 may generate at least one of a power train control signal, a brake device control signal and a steering device control signal based on the electronic horizon data.

The processor 170 may transmit the generated control signal to the driving control device 250 via the interface 180. The driving control device 250 may transmit the control signal to at least one of a power train 251, a brake device 252, and a steering device 254.

Autonomous Vehicle Usage Scenario

Figure 9:
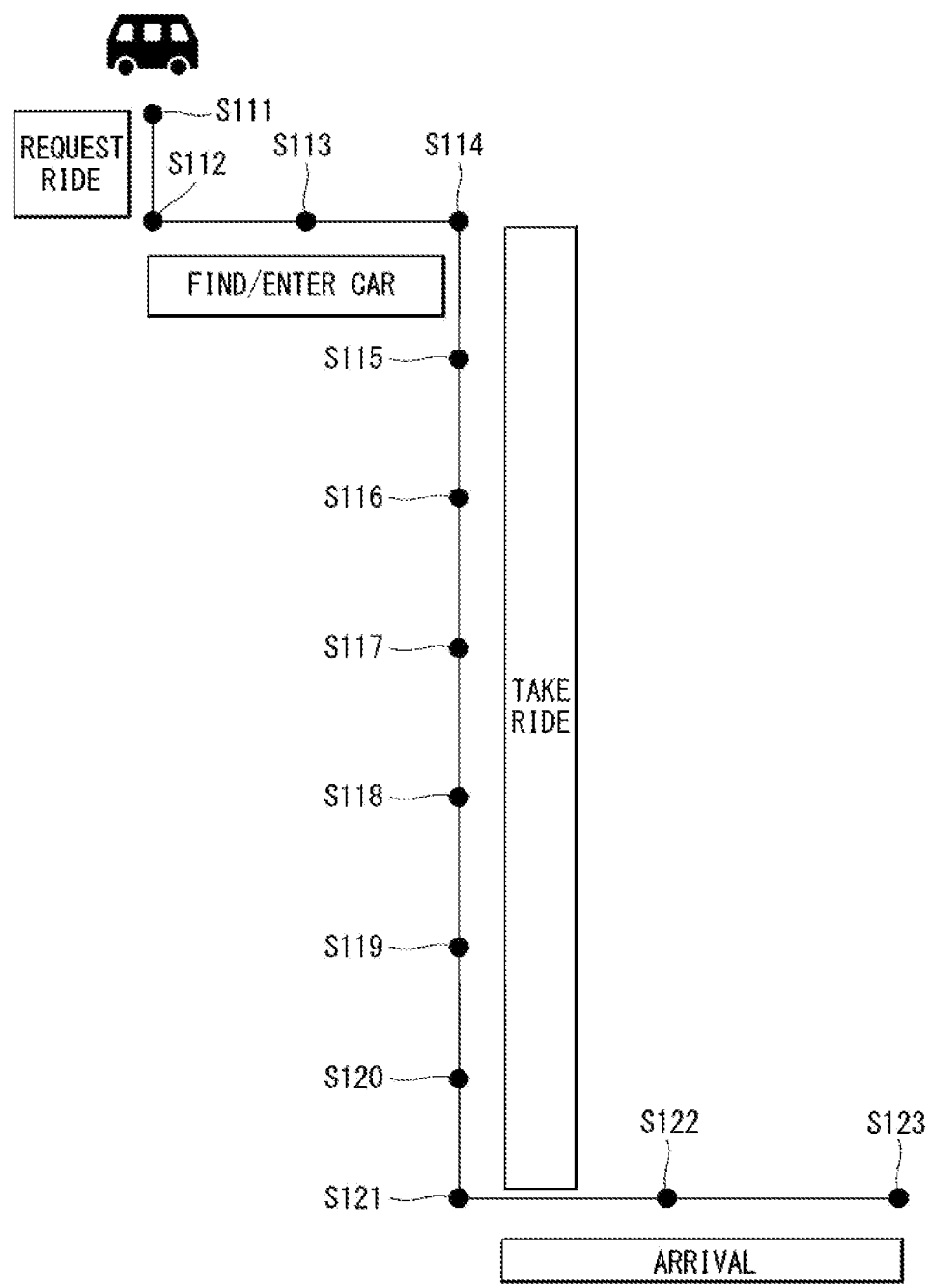
FIG. 9 is a diagram for explaining a usage scenario of a user in accordance with an embodiment of the present disclosure.

FIG. 9 is a diagram for explaining a usage scenario of a user in accordance with an embodiment of the present disclosure.

1) Destination Prediction Scenario

A first scenario S111 is a scenario for prediction of a destination of a user. An application which can operate in connection with a cabin system 300 can be installed in a user terminal. The user terminal can predict a destination of a user based on user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

A seat system 360 can configure a cabin interior layout based on at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may implement a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user based on acquired body information.

5) Personal Content Provision Scenario

A fifth scenario S115 is a personal content provision scenario. A display system 350 can receive user personal data through an input device 310 or the communication device 330. The display system 350 can provide content corresponding to the user personal data.

6) Item Provision Scenario

A sixth scenario S116 is an item provision scenario. A cargo system 355 can receive user data through the input device 310 or the communication device 330. The user data may include user preference data, user destination data, etc. The cargo system 355 can provide items based on the user data.

7) Payment Scenario

A seventh scenario S117 is a payment scenario. A payment system 365 can receive data for price calculation from at least one of the input device 310, the communication device 330 and the cargo system 355. The payment system 365 can calculate a price for use of the vehicle by the user based on the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed based on the electrical signal.

9) AI Agent Scenario

A ninth scenario S119 is a multi-channel artificial intelligence (AI) agent scenario for a plurality of users. An AI agent 372 can distinguish an user input per each of a plurality of users. The AI agent 372 can control at least one of the display system 350, the cargo system 355, the seat system 360, and the payment system 365 in response to electrical signals obtained by converting an individual user input from the plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to the plurality of users through speakers provided for respective seats. The display system 350 can provide content that can be individually viewed by the plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle based on the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data may include data about a total charge for using the vehicle 10.

V2X (Vehicle-to-Everything)

Figure 10:
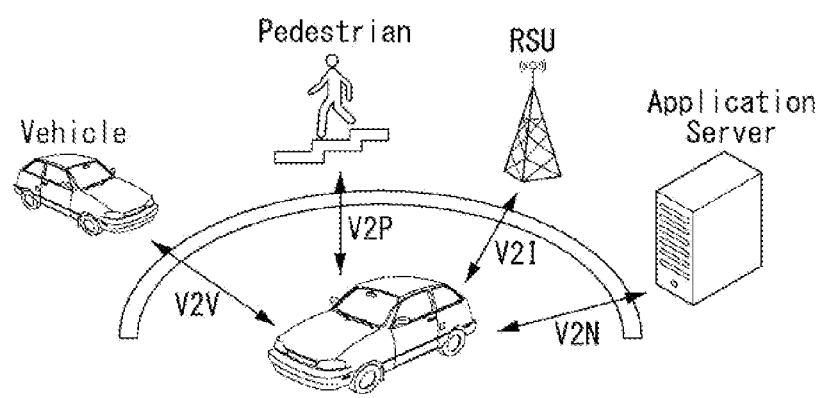
FIG. 10 illustrates an example of V2X communication to which the present disclosure is applicable.

FIG. 10 illustrates an example of V2X communication to which the present disclosure is applicable.

V2X communication includes communication between a vehicle and any entity, such as vehicle-to-vehicle (V2V) referring to communication between vehicles, vehicle-to-infrastructure (V2I) referring to communication between a vehicle and an eNB or a road side unit (RSU), vehicle-to-pedestrian (V2P) referring to communication between a vehicle and a UE carried by a person (e.g., pedestrian, bicycle driver, vehicle driver, or passenger), and vehicle-to-network (V2N).

The V2X communication may refer to the same meaning as V2X sidelink or NR V2X or refer to a wider meaning including V2X sidelink or NR V2X.

The V2X communication is applicable to various services such as forward collision warning, automated parking system, cooperative adaptive cruise control (CACC), control loss warning, traffic line warning, vehicle vulnerable safety warning, emergency vehicle warning, curved road traveling speed warning, and traffic flow control.

The V2X communication may be provided via a PC5 interface and/or a Uu interface. In this case, specific network entities for supporting communication between the vehicle and all the entities may be present in a wireless communication system supporting the V2X communication. For example, the network entity may be a BS (eNB), a road side unit (RSU), a UE, or an application server (e.g., traffic safety server), etc.

Further, the UE performing the V2X communication may refer to a vehicle UE (V-UE), a pedestrian UE, a BS type (eNB type) RSU, a UE type RSU, and a robot with a communication module as well as a handheld UE.

The V2X communication may be directly performed between UEs or performed through the network entities. V2X operation modes may be categorized according to a method of performing the V2X communication.

The V2X communication is required to support pseudonymity and privacy of UEs when a V2X application is used so that an operator or a third party cannot track a UE identifier within an area in which V2X is supported.

The terms frequently used in the V2X communication are defined as follows.

Road Side Unit (RSU): the RSU is a V2X service enabled device which can perform transmission/reception with moving vehicles using a V2I service. In addition, the RSU is a fixed infrastructure entity supporting a V2X application and can exchange messages with other entities supporting the V2X application. The RSU is a term frequently used in conventional ITS specifications and is introduced to 3GPP specifications in order to allow documents to be able to be read more easily in ITS industry. The RSU is a logical entity which combines V2X application logic with the function of a BS (BS-type RSU) or a UE (UE-type RSU).

V2I service: A type of V2X service having a vehicle as one side and an entity belonging to infrastructures as the other side.

V2P service: A type of V2X service having a vehicle as one side and a device carried by a person (e.g., a pedestrian, a bicycle rider, a driver or a handheld UE device carried by a fellow passenger) as the other side.

V2X service: A 3GPP communication service type related to a device performing transmission/reception to/from a vehicle.

V2X enabled UE: UE supporting V2X service.

V2V service: A V2X service type having vehicles as both sides.

V2V communication range: A range of direct communication between two vehicles participating in V2V service.

V2X applications called V2X (Vehicle-to-Everything) include four types of (1) vehicle-to-vehicle (V2V), (2) vehicle-to-infrastructure (V2I), (3) vehicle-to-network (V2N) and (4) vehicle-to-pedestrian (V2P) as described above.

Figure 11:
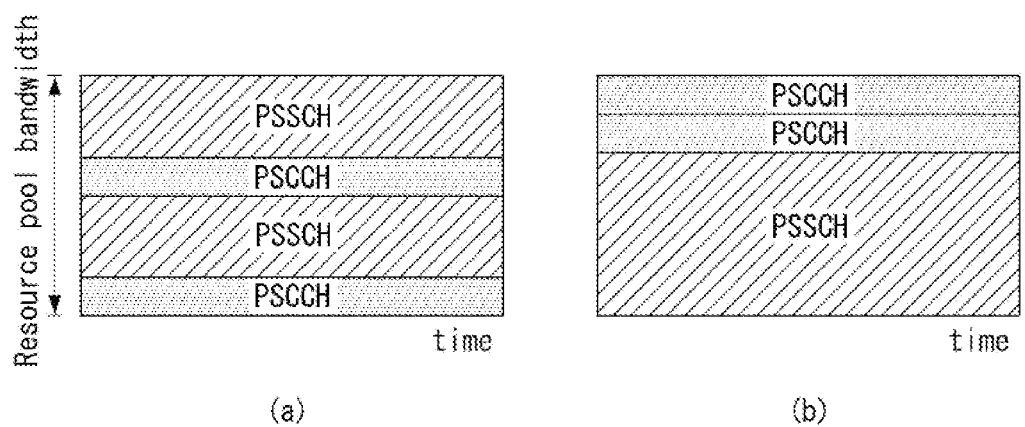
FIG. 11 illustrates a method of allocating sources in a sidelink in which V2X is used.

FIG. 11 illustrates a method of allocating sources in a sidelink in which V2X is used.

As illustrated in FIG. 11, on sidelink, different physical sidelink control channels (PSCCHs) may be spaced and allocated in the frequency domain, and different physical sidelink shared channels (PSSCHs) may be spaced and allocated. Alternatively, different PSCCHs may be continuously allocated in the frequency domain, and PSSCHs may also be continuously allocated in the frequency domain.

NR V2X

To extend 3GPP platform to auto industry during 3GPP release 14 and 15, support for V2V and V2X services has been introduced in LTE.

Requirements for support for enhanced V2X use cases are arranged into four use example groups.

(1) Vehicle platooning enables dynamic formation of a platoon in which vehicles move together. All vehicles in a platoon obtain information from the leading vehicle in order to manage the platoon. Such information allows vehicles to travel in harmony rather than traveling in a normal direction and to move together in the same direction.

(2) Extended sensors allow vehicles, road side units, pedestrian devices and V2X application servers to exchange raw data or processed data collected through local sensors or live video images. A vehicle can enhance recognition of environment beyond a level that can be detected by a sensor thereof and can ascertain local circumstances more extensively and generally. A high data transfer rate is one of major characteristics.

(3) Advanced driving enables semi-automatic or full-automatic driving. Each vehicle and/or RSU share data recognized thereby and obtained from local sensors with a neighboring vehicle, and a vehicle can synchronize and adjust a trajectory or maneuver. Each vehicle shares driving intention with a neighboring traveling vehicle.

(4) Remote driving enables a remote driver or a V2X application to drive a remote vehicle for a passenger who cannot drive or cannot drive a remote vehicle in a dangerous environment. When changes are limited and routes can be predicted such as public transportation, driving based on cloud computing can be used. High reliability and low latency time are major requirements.

The above-described 5G communication technology can be applied in conjunction with methods according to the present invention to be described below, or may be supplemented to further specify or clarify technical feature of the methods described in the present invention. In addition, a method for controlling an autonomous vehicle described in the present invention can be applied in conjunction with 3G, 4G and/or 6G communication services as well as the above-described 5G communication technology.

Figure 12:
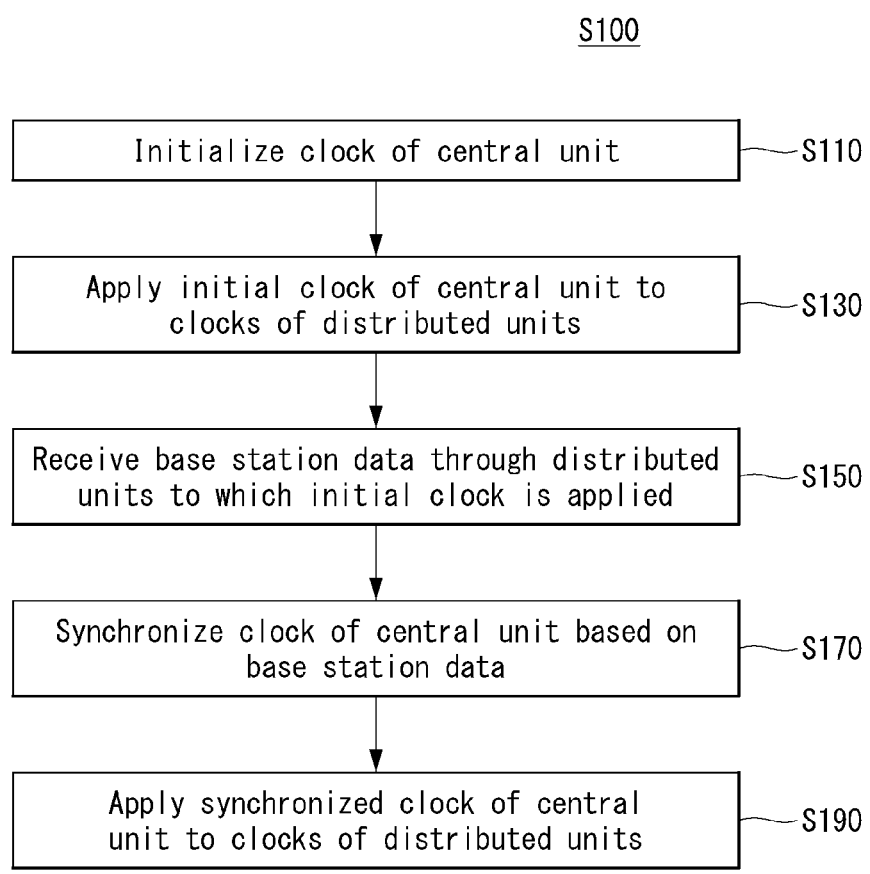
FIG. 12 is a flow chart illustrating a method for controlling an autonomous vehicle according to an embodiment of the present disclosure.

FIG. 12 is a flow chart illustrating a method for controlling an autonomous vehicle according to an embodiment of the present disclosure.

A method for controlling an autonomous vehicle illustrated in FIG. 12 may be performed by the first communication device 910 and the second communication device 920 of FIG. 1, the autonomous vehicle of FIG. 3, the autonomous vehicle 1 and the autonomous vehicle 2 of FIG. 4, the vehicle 10 and the autonomous device 260 of FIGS. 5 and 6, the processor 170 of FIGS. 7 and 8, or the vehicle of FIG. 10. However, although it is described that the autonomous vehicle performs the method for controlling the autonomous vehicle according to the present disclosure for convenience of explanation, the present disclosure is not limited thereto.

As illustrated in FIG. 12, a method S100 for controlling an autonomous vehicle according to an embodiment of the present disclosure includes steps S110 to S190, and the steps are described in detail below. The autonomous vehicle may include a plurality of distributed units for receiving data from a base station and a central unit for controlling the plurality of distributed units.

First, the autonomous vehicle may initialize clock of the central unit in S110. That is, after power is turned on, the autonomous vehicle may initialize the clock included in the central unit to a predetermined value. That is, the autonomous vehicle may apply an initial clock to the clock of the central unit. That is, the autonomous vehicle may set the initial clock to the clock of the central unit.

Subsequently, the autonomous vehicle may apply the initial clock applied/set to the central unit to clocks of the plurality of distributed units in S130. That is, the autonomous vehicle may transmit the initial clock applied/set to the central unit to the plurality of distributed units, and each distributed unit may apply the initial clock received from the central unit to a clock included in each distributed unit.

Next, the autonomous vehicle may receive data from the base station through the plurality of distributed units, to which the initial clock is applied, in S150. That is, the autonomous vehicle may receive data from the base station, that is an external communication device, using a plurality of antennas included in each of the plurality of distributed units, to which the initial clock is applied/set. The clock of the base station and the clocks of the plurality of distributed units may be in a non-synchronized state. The clock of the base station and the clock of the central unit may be in a non-synchronized state. That is, the plurality of clocks (clock of the central unit and clocks of the plurality of distributed units) of the autonomous vehicle are synchronized to the initial clock, but the plurality of clocks of the autonomous vehicle and the clock of the base station may be in a non-synchronized state.

Subsequently, the autonomous vehicle may synchronize the clock of the central unit with the clock of the base station based on base station data received through the plurality of distributed units in S170. The autonomous vehicle may obtain a frequency offset between the base station and the autonomous vehicle using the base station data, obtain the clock of the base station using the frequency offset, and apply the clock of the base station to the clock of the central unit of the autonomous vehicle.

Next, the autonomous vehicle may apply the clock of the central unit synchronized with the clock of the base station to the clocks of the plurality of distributed units in S190. That is, the central unit may transmit the clock of the central unit synchronized with the clock of the base station to each distributed unit, and each distributed unit may apply the transmitted clock of the central unit to the clock of each distributed unit.

Figure 13:
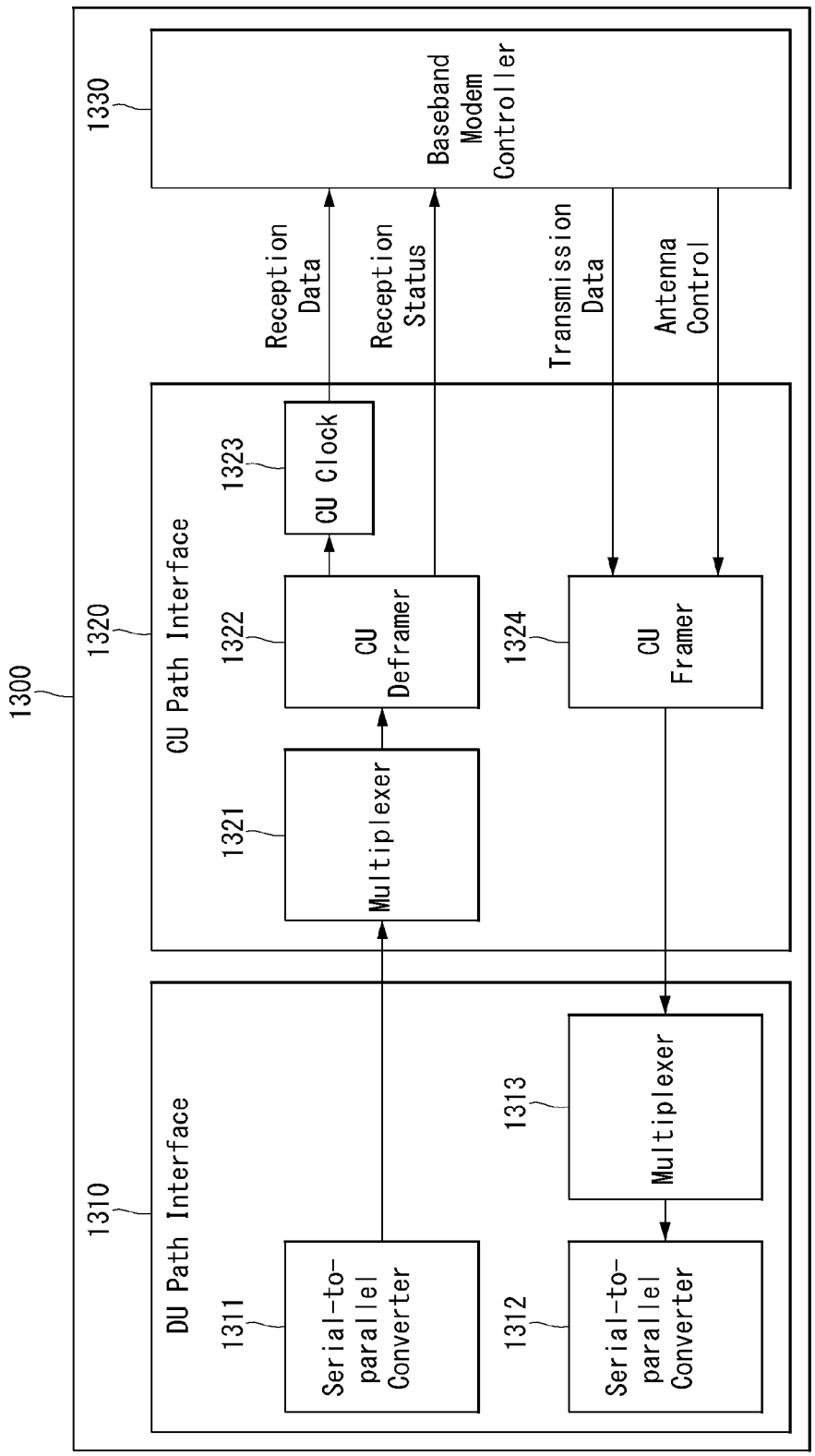
FIG. 13 illustrates an example of a central unit according to an embodiment of the present disclosure.

FIG. 13 illustrates an example of a central unit according to an embodiment of the present disclosure.

When a system for cellular communication is installed in an autonomous vehicle, the autonomous vehicle can improve performance and reliability of wireless communication by distributing a plurality of units each including an antenna.

The cellular communication system (autonomous system) implementing a plurality of distributed units (distributed antennas) may include one central unit (CU) and a plurality of distributed units (DUs) depending on the implementation location.

The distributed unit consists of an antenna for transmitting and receiving a radio frequency (RF) signal and an additional circuit connected to the antenna. The central unit consists of a digital baseband modem (baseband modem controller) and an additional circuit connected thereto. For example, with the exception of the antenna of the distributed unit and the digital baseband modem of the central unit, various implementation methods can be applied according to the implementation purpose of the communication system.

The autonomous vehicle may consist of N distributed units that allow transmission/reception shadow areas to be minimized, and each distributed unit may exist in a distributed location. The digital baseband modem in the central unit can support M radio frequency (RF) paths in consideration of the implementation cost of transmit/receive circuits, where N>=M.

FIGS. 13 to 16 illustrate a structure of an autonomous vehicle that achieves maximum wireless communication performance and stability while configuring the number of distributed units and the number of radio frequency paths to a minimum.

As illustrated in FIG. 13, a central unit (CU) 1300 of an autonomous vehicle may include a DU path interface 1310, a CU path interface 1320, and a baseband modem controller 1330. The DU path interface 1310, the CU path interface 1320, and the baseband modem controller 1330 must synchronize their operating clocks with each other for normal data transmission and reception between them. Further, clocks of the autonomous vehicle (or UE) must be synchronized with clocks of a base station. That is, the autonomous vehicle can normally transmit and receive data after performing clock synchronization with the base station.

The DU path interface 1310 may include serial-to-parallel converters 1311 and 1312 that transmit and receive an interface signal to and from distributed units. The DU path interface 1310 may further include a multiplexer 1313 that multiplexes transmission data received from the baseband modem controller 1330 via the CU path interface 1320.

The CU path interface 1320 may include a multiplexer 1321 that multiplexes reception data transmitted via the DU path interface 1310. The CU path interface 1320 may further include a CU deframer 1322 that deframes reception data multiplexed by the multiplexer 1321. The CU path interface 1320 may further include a CU clock 1323 (or CU data recovery block) that synchronizes a clock with a clock of a base station based on reception data received from the CU deframer 1322. The CU path interface 1320 may further include a CU framer 1324 that frames transmission data and antenna control signals received from the baseband modem controller 1330.

The baseband modem controller 1330 may receive reception data and a reception status from the CU path interface 1320. The baseband modem controller 1330 may transmit transmission data and antenna control signals to the DU via the CU path interface 1320 and the DU path interface 1310.

Figure 14:
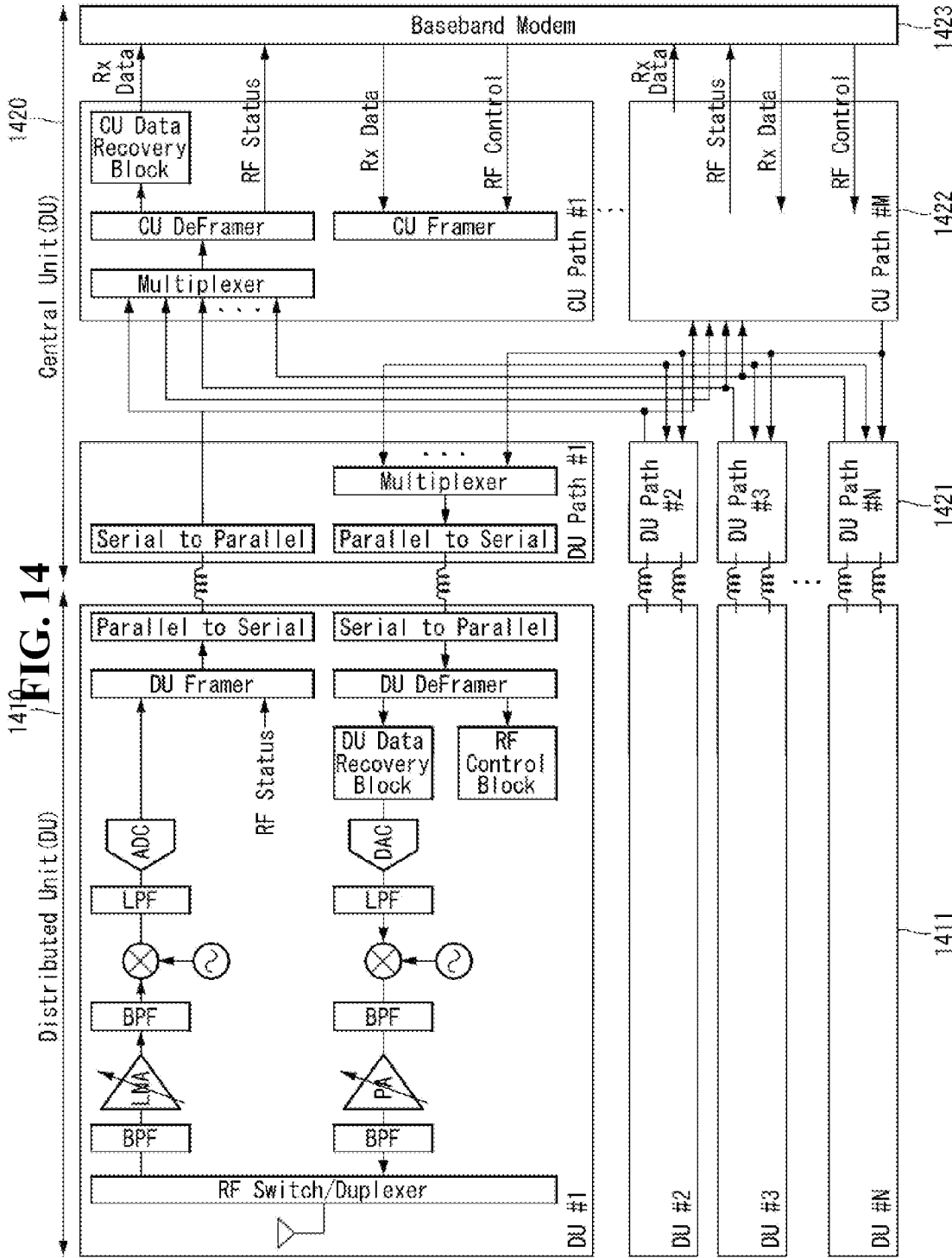
FIG. 14 illustrates an example of a communication module according to an embodiment of the present disclosure.

FIG. 14 illustrates an example of a communication module according to an embodiment of the present disclosure.

As illustrated in FIG. 14, a communication module of an autonomous vehicle according to an embodiment of the present disclosure may include a central unit 1420 and N distributed units 1410. The communication module consisting of the central unit 1420 and the N distributed units 1410 may include at least one component of the Tx processors 912, the Rx processor 913, the Tx/Rx RF module 915, the antenna 916, the Tx processor 922, the Rx processor 923, the Tx/Rx RF module 925, and the antenna 926 that are described above with reference to FIG. 1. The communication module may be the communication device 220 of FIGS. 6 and 7. In particular, each distributed unit may include the antennas of FIG. 1.

The central unit may include N DU path interfaces 1421 (DU Path #1, DU Path #2, . . . , DU Path #N) that exchange an interface with N distributed units 1411, respectively. Each DU path interface may be connected in series to each distributed unit, and the DU path interfaces may be connected in parallel to each other.

The central unit may include M CU path interfaces 1422 (CU Path #1, CU Path #2, . . . , CU Path #M) that transmit and receive transmission data and/or reception data to and from the N DU path interfaces. Each CU path interface may receive transmission data from a baseband modem 1423 and transmit it to the distributed units via the DU path interface, and may also receive reception data from the distributed units via the DU path interface and transmit it to the baseband modem 1423.

Each distributed unit may include (RF) antennas, and clock of each antenna may be supplied from a voltage controlled-temperature compensated crystal oscillator (VC-TCXO). The VC-TCXO may be synchronized with operating clock of the base station in response to control signals from the antenna or the baseband modem.

Figure 15:
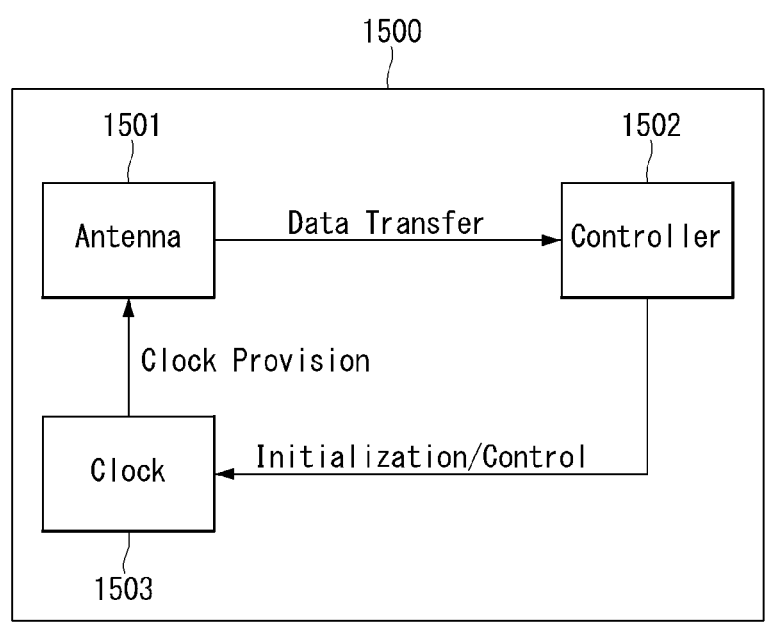
FIG. 15 illustrates another example of a communication module according to an embodiment of the present disclosure.

FIG. 15 is a block diagram illustrating another example of a communication module according to an embodiment of the present disclosure.

As illustrated in FIG. 15, a communication module 1500 may include a central unit and a distributed unit, and the central unit and the distributed unit may include an antenna 1501, a controller 1502, and a clock 1503.

First, the antenna 1501 may receive external data and transmit the received data to the controller 1502. The antenna 1501 may be included in the distributed unit.

The controller 1502 may initialize the clock or control the clock based on the received data. The controller 1502 may be included in the central unit.

The clock 1503 may change/set a clock value in response to a control signal of the controller 1502, and provide the changed/set clock value to the antenna 1501. The clock 1503 may be included in both the central unit and the distributed unit.

Figure 16:
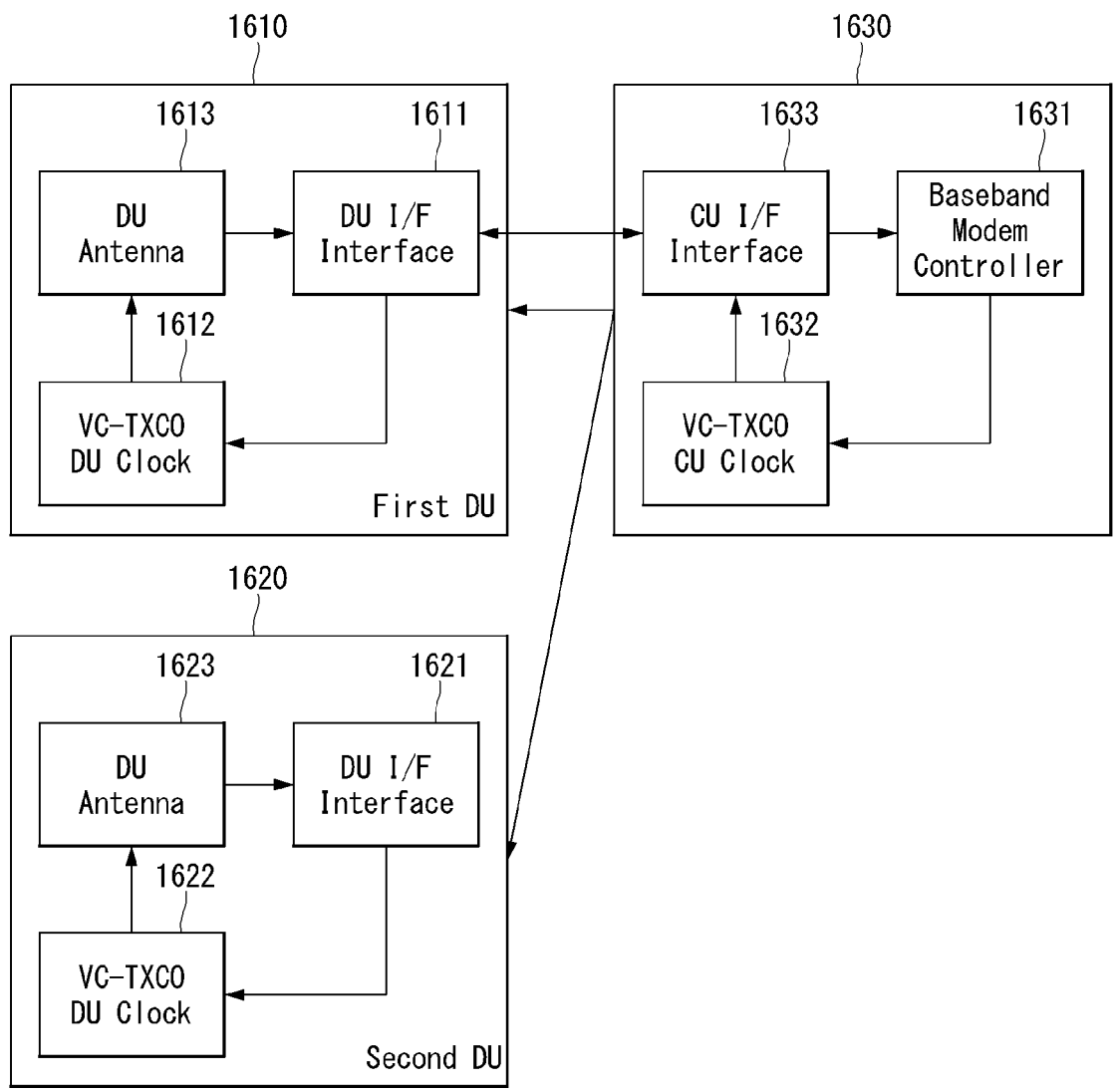
FIG. 16 illustrates another example of a communication module according to an embodiment of the present disclosure.

FIG. 16 is a block diagram illustrating another example of a communication module according to an embodiment of the present disclosure.

As illustrated in FIG. 16, a communication module of an autonomous vehicle may include a central unit 1630, a first distributed unit (DU) 1610, and a second distributed unit (DU) 1620.

A CU I/F interface 1633 of the central unit 1630 may transmit base station data received from each distributed unit to a baseband modem controller 1631.

The baseband modem controller 1631 of the central unit 1630 may initialize a VC-TXCO CU clock 1632. The baseband modem controller 1631 may synchronize the VC-TXCO CU clock 1632 with the clock of the base station using base station data received from each distributed unit via the CU I/F interface 1633.

The baseband modem controller 1631 of the central unit 1630 may transmit information related to the clock of the base station to each distributed unit via the CU I/F interface 1633.

The VC-TXCO CU clock 1632 of the central unit 1630 may provide the applied clock to the CU I/F interface 1633.

DU I/F interfaces 1611 and 1621 of the respective distributed units may apply the transmitted clock value of the base station to VC-TXCO DU clocks 1612 and 1622.

The VC-TXCO DU clocks 1612 and 1622 of the respective distributed units may provide the applied clock to DU antennas 1613 and 1623 of the respective distributed units.

The DU antenna of each distributed unit may receive base station data in response to the clock synchronized with the base station.

The DU I/F interface and the CU I/F interface may be connected to each other via a high speed serial interface. For example, the high speed serial interface may be 10 GbE Ethernet. Since 10 GbE Ethernet interface performs packet-based communication, it is easy to map base station data and clock-related information to packets. In addition, the corresponding interface facilitates data recovery and clock recovery. The central unit may use a reference clock of 10 GbE interface generated from the VC-TCXO CU clock and may transmit it to each distributed unit. Each distributed unit may control the VC-TCXO DU clock in the distributed unit to be synchronized with the clock of the central unit using clock information received from the 10 GbE interface.

For example, the central unit may define a protocol capable of transmitting data and clock related information to a high speed serial interface, and may transmit data and clock related information to the distributed unit based on the defined protocol. Due to the system configuration, the plurality of distributed units may be connected to each central unit, and the baseband modem controller of the central unit may select some of data signals received from the plurality of distributed units and analyze the selected data signal to calculate a clock offset with the base station. Then, the baseband modem controller may adjust the VC-TCXO CU clock included in the central unit as much as the calculated clock offset, and the clock of the central unit may be transmitted to each distributed unit via the CU I/F interface and the DU I/F interface.

FIG. 17 is a flow chart illustrating a detailed example of a clock synchronization method of an autonomous vehicle according to an embodiment of the present disclosure.

As illustrated in FIG. 17, an autonomous vehicle may initialize a VC-TCXO clock of a central unit (CU) in S1701.

Subsequently, the autonomous vehicle may transmit CU data to a plurality of distributed units (DUs) from the CU in S1703. The CU data may include data related to the initialized clock.

Next, the autonomous vehicle may obtain an initial clock of the CU using the CU data in each DU in S1705.

Subsequently, the autonomous vehicle may apply the initial clock of the CU to a VC-TCXO clock of the DU in S1707. For example, each DU may calculate a frequency offset of the VC-TCXO clock in the DU and a clock received from the CU, and adjust a frequency of the VC-TXCO clock in the DU using the calculated frequency offset so that the frequency of the VC-TXCO clock in the DU is the same as a frequency of a VC-TXCO clock of the CU.

Next, the autonomous vehicle may apply the initial clock of the CU to an antenna of the DU in S1709.

Subsequently, the autonomous vehicle may receive base station data via the antenna of the DU in S1711.

Next, the autonomous vehicle may obtain a frequency offset with the base station in the CU using the base station data in S1713.

Subsequently, the autonomous vehicle may synchronize clocks of the CU and the DU with clocks of the base station using the frequency offset with the base station in S1715. For example, the baseband modem controller of the CU may adjust a frequency of the VC-TCXO clock of the CU so that a difference between a clock frequency of the base station and a frequency of the VC-TCXO clock of the CU is zero.

Embodiment 1: a method for controlling an autonomous vehicle including a baseband modem and a plurality of distributed antennas includes applying an initial clock of the baseband modem to clocks of the plurality of distributed antennas; receiving base station data from an external base station via the plurality of distributed antennas to which the initial clock is applied; and synchronizing a clock of the baseband modem with a clock of the base station based on the base station data.

Embodiment 2: in the embodiment 1, synchronizing the clock of the baseband modem with the clock of the base station may include transmitting the base station data to the baseband modem from the plurality of distributed antennas via a high speed serial interface connecting the baseband modem to the plurality of distributed antennas.

Embodiment 3: in the embodiment 2, the method may further include applying the clock of the base station to the clocks of the plurality of distributed antennas.

Embodiment 4: in the embodiment 3, applying the clock of the base station to the clocks of the plurality of distributed antennas may include transmitting the clock of the base station to the plurality of distributed antennas via the high speed serial interface.

Embodiment 5: in the embodiment 4, the high speed serial interface may include path interfaces of which the number is equal to or less than the number of the plurality of distributed antennas.

Embodiment 6: an autonomous vehicle includes a processor configured to control a function of the autonomous vehicle; a memory coupled to the processor and configured to store data for control of the autonomous vehicle; and a communication unit coupled to the processor and configured to transmit and receive data for control of the autonomous vehicle, wherein the memory is configured to store instructions that allow the processor to apply an initial clock of a baseband modem included in the communication unit to clocks of a plurality of distributed antennas included in the communication unit, receive base station data from an external base station through the communication unit via the plurality of distributed antennas to which the initial clock is applied; and synchronize a clock of the baseband modem with a clock of the base station based on the base station data.

Embodiment 7: in the embodiment 6, the processor may be configured to transmit the base station data to the baseband modem from the plurality of distributed antennas via a high speed serial interface connecting the baseband modem to the plurality of distributed antennas.

Embodiment 8: in the embodiment 7, the processor may be configured to apply the clock of the base station to the clocks of the plurality of distributed antennas.

Embodiment 9: in the embodiment 8, the processor may be configured to transmit the clock of the base station to the plurality of distributed antennas via the high speed serial interface.

Embodiment 10: in the embodiment 9, the high speed serial interface may include path interfaces of which the number is equal to or less than the number of the plurality of distributed antennas.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A method for controlling an autonomous vehicle including a baseband modem and a plurality of distributed antennas, the method comprising:
   setting an initial clock of the baseband modem by initializing a clock of the baseband modem;
   synchronizing initial clocks of the plurality of distributed antennas with the initial clock of the baseband modem;
   receiving base station data from an external base station via the plurality of distributed antennas to which the initial clock is applied;
   setting a final clock of the baseband modem by synchronizing the initial clock of the baseband modem with a clock of the base station based on the base station data; and
   setting final clocks of the plurality of distributed antennas by synchronizing the initial clocks of the plurality of distributed antennas with the final clock of the baseband modem.

2. The method of claim 1, wherein synchronizing the initial clock of the baseband modem with the clock of the base station comprises transmitting the base station data to the baseband modem using the plurality of distributed antennas through a high speed serial interface connecting the baseband modem to the plurality of distributed antennas.

3. The method of claim 2, wherein the high speed serial interface includes path interfaces, wherein a number of the path interfaces is less than or equal to a number of the plurality of distributed antennas.

4. An autonomous vehicle comprising:
   a processor;
   a memory operably coupled to the processor and configured to store data; and
   a transceiver coupled to the processor and configured to transmit and receive the data for control of the autonomous vehicle,
   wherein the memory is configured to store instructions that allow the processor to:
   set an initial clock of the baseband modem by initializing a clock of the baseband modem;
   synchronize initial clocks of the plurality of distributed antennas included in the transceiver with the initial clock of a baseband modem included in the transceiver;
   receive base station data from an external base station through the transceiver via the plurality of distributed antennas to which the initial clock is applied;
   set a final clock of the baseband modem by synchronizing the initial synchronize a clock of the baseband modem with a clock of the base station based on the base station data; and
   set final clocks of the plurality of distributed antennas by synchronizing the initial clocks of the plurality of distributed antennas with the final clock of the baseband modem.

5. The autonomous vehicle of claim 4, wherein the processor is further configured to transmit the base station data to the baseband modem via a high speed serial interface connecting the baseband modem to the plurality of distributed antennas.

6. The autonomous vehicle of claim 5, wherein the high speed serial interface includes path interfaces, wherein a number of the path interfaces is less than or equal to a number of the plurality of distributed antennas.

* * * * *